(12) United States Patent
Nandu et al.

(10) Patent No.: US 11,907,138 B2
(45) Date of Patent: Feb. 20, 2024

(54) MULTIMEDIA COMPRESSED FRAME AWARE CACHE REPLACEMENT POLICY

(71) Applicant: QUALCOMM Incorporated, San Diego, CA (US)

(72) Inventors: Hiral Nandu, South San Francisco, CA (US); Subbarao Palacharla, San Diego, CA (US); George Patsilaras, San Diego, CA (US); Alain Artieri, San Diego, CA (US); Simon Peter William Booth, San Diego, CA (US); Vipul Gandhi, San Diego, CA (US); Girish Bhat, San Diego, CA (US); Yen-Kuan Wu, San Diego, CA (US); Younghoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/646,690

(22) Filed: Dec. 31, 2021

(65) Prior Publication Data

US 2023/0214330 A1    Jul. 6, 2023

(51) Int. Cl.
*G06F 12/123* (2016.01)
*G06F 9/30* (2018.01)

(52) U.S. Cl.
CPC ........ *G06F 12/123* (2013.01); *G06F 9/30101* (2013.01)

(58) Field of Classification Search
None
See application file for complete search history.

(56) References Cited

U.S. PATENT DOCUMENTS

| 2009/0019228 | A1 | 1/2009 | Brown et al. |
| 2013/0097387 | A1 | 4/2013 | Sanchez et al. |
| 2014/0089559 | A1 | 3/2014 | Cai et al. |
| 2015/0088805 | A1* | 3/2015 | Kakarla ............ G06F 16/24552 707/600 |
| 2020/0192813 | A1* | 6/2020 | Hiscock .............. G06F 12/0855 |

(Continued)

FOREIGN PATENT DOCUMENTS

EP    0088239 A2    9/1983

OTHER PUBLICATIONS

M. Kharbutli and Y. Solihin, "Counter-Based Cache Replacement and Bypassing Algorithms," in IEEE Transactions on Computers, vol. 57, No. 4, pp. 433-447, Apr. 2008 (Year: 2008).*

(Continued)

*Primary Examiner* — Edward J Dudek, Jr.
*Assistant Examiner* — Ralph A Verderamo, III
(74) *Attorney, Agent, or Firm* — The Marbury Law Group/Qualcomm

(57) ABSTRACT

Various embodiments include methods and devices for implementing a criterion aware cache replacement policy by a computing device. Embodiments may include updating a staling counter, writing a value of a local counter to a system cache in association with a location in the system cache for with data, in which the value of the local counter includes a value of the staling counter when (i.e., at the time) the associated data is written to the system cache, and using the value of the local counter of the associated data to determine whether the associated data is stale.

30 Claims, 16 Drawing Sheets

(56) References Cited

U.S. PATENT DOCUMENTS

2022/0283956 A1* 9/2022 Carpenter ............. G06F 12/122
2023/0079746 A1* 3/2023 Chen ................... G06F 12/0868
                                                      711/118

OTHER PUBLICATIONS

Mathcentre, "Manipulating inequalities" [online], 2009 [retrieved on Jul. 25, 2023]. Retrieved from the Internet:<URL:http://www.mathcentre.ac.uk/resources/uploaded/mc-bus-manipinequ-2009-1.pdf>. (Year: 2009).*

International Search Report and Written Opinion—PCT/US2022/049820—ISA/EPO—dated Mar. 7, 2023 18 pages.

* cited by examiner

MULTIMEDIA COMPRESSED FRAME AWARE CACHE REPLACEMENT POLICY

BACKGROUND

A system cache of a computing device may store data according to one or more replacement policies, such as not-most recently used (nMRU) and capacity based first-in, first-out (FIFO). The nMRU and FIFO policies are not optimal for various uses cases, such as for multimedia frame-based clients in which the temporal locality is within a frame time boundary and capacity allocation can vary based on compression ratios.

SUMMARY

Various aspects of this disclosure provide methods include methods and apparatuses for implementing such methods of implementing a criterion aware cache replacement policy by a computing device, which may include updating a staling counter, writing a value of a local counter to a system cache in association with a location in the system cache for associated data in which the value of the local counter includes a value of the staling counter when the associated data is written to the system cache, and using the value of the local counter of the associated data to determine whether the associated data is stale.

In some aspects, updating the staling counter may include receiving a signal from a client of the computing device configured to indicate whether to update the staling counter, determining whether to update the staling counter based on the signal, and updating the staling counter in response to determining to update the staling counter.

In some aspects, the signal is a register write command, receiving the signal from the client of the computing device may include reading a value from a register set by the client, and determining whether to update the staling counter based on the signal may include determining whether to update the staling counter based on the value from the register.

Some aspects may include setting the value at the register by the client of the computing device based on a time-based criterion.

Some aspects may include setting the value at the register by the client of the computing device based on an event based criterion.

Some aspects may include receiving a memory write command, in which writing the value of the local counter to the system cache in association with the location in the system cache for the associated data may occur before updating the staling counter, and in which the associated data is data of the write memory command.

In some aspects, using the value of the local counter of the associated data to determine whether the associated data is stale may include calculating a replacement value using a value of the staling counter and the value of the local counter, and determining whether the replacement value exceeds a staling threshold, in which the associated data is determined to be stale in response to determining that the replacement value exceeds the staling threshold.

Some aspects may include receiving a memory access command, and writing data of the memory access command to the system cache at a location for which the replacement value exceeds the staling threshold, in which the data of the memory access command written to the system cache is the associated data.

Some aspects may include receiving a memory write command, invalidating data at a location for which the replacement value exceeds the staling threshold, and writing data of the memory write command to the system cache at a location having the invalidated data, in which the data of the memory write command written to the system cache is the associated data.

Some aspects may include receiving a memory write access command, and writing data of the memory write access command to the system cache at a location according to another cache replacement policy in response to determining that no replacement value exceeds the staling threshold.

Further aspects include a computing device including a memory control device configured to perform operations of any of the methods summarized above. Further aspects include a non-transitory processor-readable storage medium having stored thereon processor-executable software instructions configured to cause a processor to perform operations of any of the methods summarized above. Further aspects include a computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
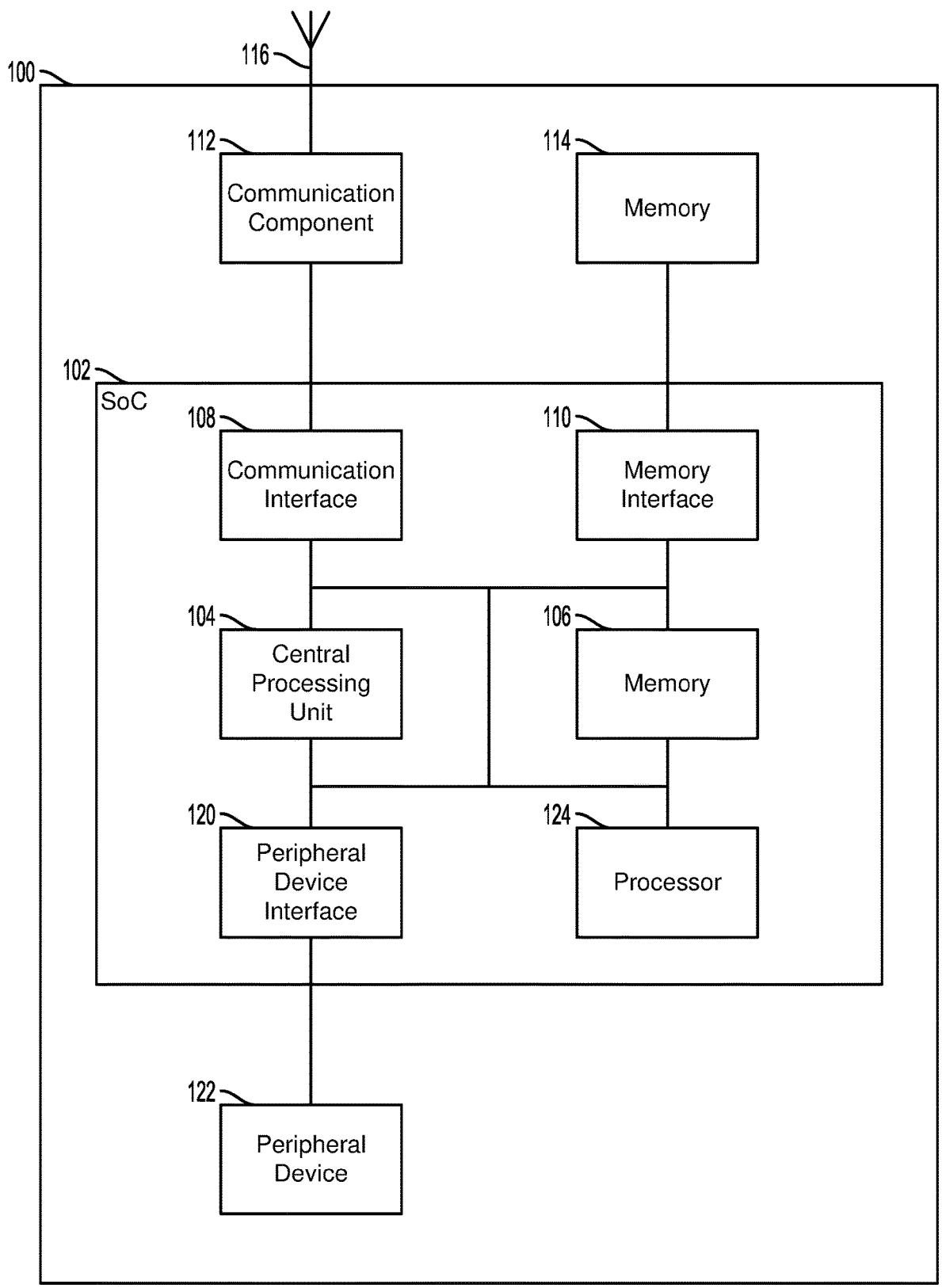
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods of implementing a criterion aware cache replacement policy. Embodiments may include associating data written to a system cache with a local counter. The value of the local counter may include a value of a staling counter at a time (i.e., when) the associated data is written to the system cache. A replacement value for the data in the system cache may be calculated using the local value of the associated data and compared to a staling threshold. The value of the local counter of the associated data may be used to determine whether the associated data is stale. The data in the system cache associated with the local counter used to calculate the replacement value may be replaced in response to the replacement value exceeding and/or equaling the staling threshold.

The term "computing device" is used herein to refer to stationary computing devices including personal computers, desktop computers, all-in-one computers, workstations, super computers, mainframe computers, embedded computers (such as in vehicles and other larger systems), computerized vehicles (e.g., partially or fully autonomous terrestrial, aerial, and/or aquatic vehicles, such as passenger vehicles, commercial vehicles, recreational vehicles, military vehicles, drones, etc.), servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

Various embodiments are described in terms of code, e.g., processor-executable instructions, for ease and clarity of explanation, but may be similarly applicable to any data, e.g., code, program data, or other information stored in memory. The terms "code", "data", and "information" are used interchangeably herein and are not intended to limit the scope of the claims and descriptions to the types of code, data, or information used as examples in describing various embodiments.

Typically, the system cache of a computing device controls the memory spaced in which data is cached using one or more data replacement policies, such as not-most recently used (nMRU) and first-in, first-out (FIFO). The nMRU and FIFO policies are not optimal for various uses cases, including, for example, multimedia frame-based clients in which the temporal locality is within a frame time boundary and capacity allocation can vary based on compression ratios. The replacement policy of NMRU is insufficient when cache lines accessed from multimedia clients have different access frequency and are only valid for a certain timeframe. FIFO replacement behavior is not guaranteed with self-adaptive partitioning, in which cache a partition may vary in size over time, when sub-caches are filled with compressed frames.

Various embodiments address and solve limitations in conventional cache replacement policies. A client, such as a processor or a process of a software program executed by the processor (e.g., an operating system and/or an application), may signal (e.g., via a communication, a register write, a direct interrupt, etc.) a need to update a staling counter for data in a system cache. For ease of explanation, some examples may be described herein in terms of a register write; however, such examples are not intended to limit the scope of the claims or descriptions to register writes. One of skill in the art would understand that other types or methods of signaling the processor may serve the same or similar functions. The register write may be issued based on a criterion, such as a time (i.e., a time-based criterion), event (i.e., an event-based criterion), and/or other metric. For example, the register write may be issued at a beginning and/or an end of a frame of compressed multimedia data based on a frame time boundary, a color field within a frame of compressed multimedia data, etc. A processor or the system cache may associate a value of the staling counter, as a local counter, with the data in the system cache. For example, the processor or the system cache may associate the value of the staling counter in a tag of a system cache line during insertion or use of data at the system cache line. A processor or the system cache may associate the local counter, including the value of the staling counter, with the data when (i.e., at the time) the associated data is written to the system cache. Because the local counter is associated with data in the system cache when the associated data is written to the system cache, the staling counter may indicate stale data by differentiating data in the system cache, and thus may be used by the processor or to assist with identifying candidate replacement memory locations for a new write command.

A staling threshold may be used by a processor or the system cache to determine whether data in the system cache is stale and can be replaced in the next write of data to the system cache. The staling threshold may be preconfigured based on a criterion aware cache replacement policy. A replacement value of data in the system cache, which may be calculated using the staling counter and the value of the local counter associated with the data, may be compared to the staling threshold to determine whether the associated data is stale and may be replaced in the next write of data to the system cache.

Various embodiments provide cache replacement policy methods by which stale data within the cache may be tracked so that stale data has a higher chance of being replaced than non-stale data in the next write of data to the system cache. Identifying stale data using methods of various embodiments may enable deterministic cache use, and thus improve the operations of computing devices by improving last level cache use and reduced traffic in double data rate (DDR) synchronous dynamic random-access memory (SDRAM).

FIG. 1 illustrates a system including a computing device 100 suitable for use with various embodiments. The computing device 100 may include a system-on-chip (SoC) 102 with a central processing unit 104, a memory 106, a communication interface 108, a memory interface 110, a peripheral device interface 120, and a processing device 124. The computing device 100 may further include a communication component 112, such as a wired or wireless modem, a memory 114, an antenna 116 for establishing a wireless communication link, and/or a peripheral device 122. The processor 124 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors and/or processor cores, such as a central processing unit (CPU) 104, and/or processor 124, including a general purpose processor, a central processing unit (CPU) 104, a digital signal processor (DSP), a graphics processing unit (GPU), an accelerated processing unit (APU), a secure processing unit (SPU), an intellectual property unit (IPU), a subsystem processor of specific components of the computing device, such as an image processor for a camera subsystem or a display processor for a display, an auxiliary processor, a peripheral device processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more CPUs 104 and processors 124. The computing device 100 may include more than one SoC 102, thereby increasing the number of CPUs 104, processors 124, and processor cores. The computing device 100 may also include CPUs 104 and processors 124 that are not associated with an SoC 102. Individual CPUs 104 and processors 124 may be multicore processors. The CPUs 104 and processors 124 may each be configured for specific purposes that may be the same as or different from other CPUs 104 and processors 124 of the computing device 100. One or more of the CPUs 104, processors 124, and processor cores of the same or different configurations may be grouped together. A group of CPUs 104, processors 124, or processor cores may be referred to as a multi-processor cluster.

The memory 106 of the SoC 102 may be a volatile or non-volatile memory configured for storing data and processor-executable code for access by the CPU 104, the processor 124, or other components of SoC 102. The computing device 100 and/or SoC 102 may include one or more memories 106 configured for various purposes. One or more memories 106 may include volatile memories such as random-access memory (RAM), including DDR memory, implemented as main memory or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the CPU 104 and/or processor 124 and temporarily stored for future quick access without being stored in non-volatile memory. The memory 106 may be configured to store data and processor-executable code, at least temporarily, that is loaded to the memory 106 from another memory device, such as another memory 106 or memory 114, for access by one or more of the CPU 104, the processor 124, or other components of SoC 102. In some embodiments, any number and combination of memories 106 may include one-time programmable or read-only memory.

The memory interface 110 and the memory 114 may work in unison to allow the computing device 100 to store data and processor-executable code on a volatile and/or non-volatile storage medium, and retrieve data and processor-executable code from the volatile and/or non-volatile storage medium. The memory 114 may be configured much like an embodiment of the memory 106, such as main memory, in which the memory 114 may store the data or processor-executable code for access by one or more of the CPU 104, the processor 124, or other components of SoC 102. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the CPU 104, the processor 124, or other components of the SoC 102 to read data from and write data to the memory 114.

Some or all of the components of the computing device 100 and/or the SoC 102 may be arranged differently and/or combined while still supporting the functions of various embodiments. The computing device 100 may not be limited to one of each of the components, and multiple instances of each component may be included in various configurations of the computing device 100.

Figure 2:
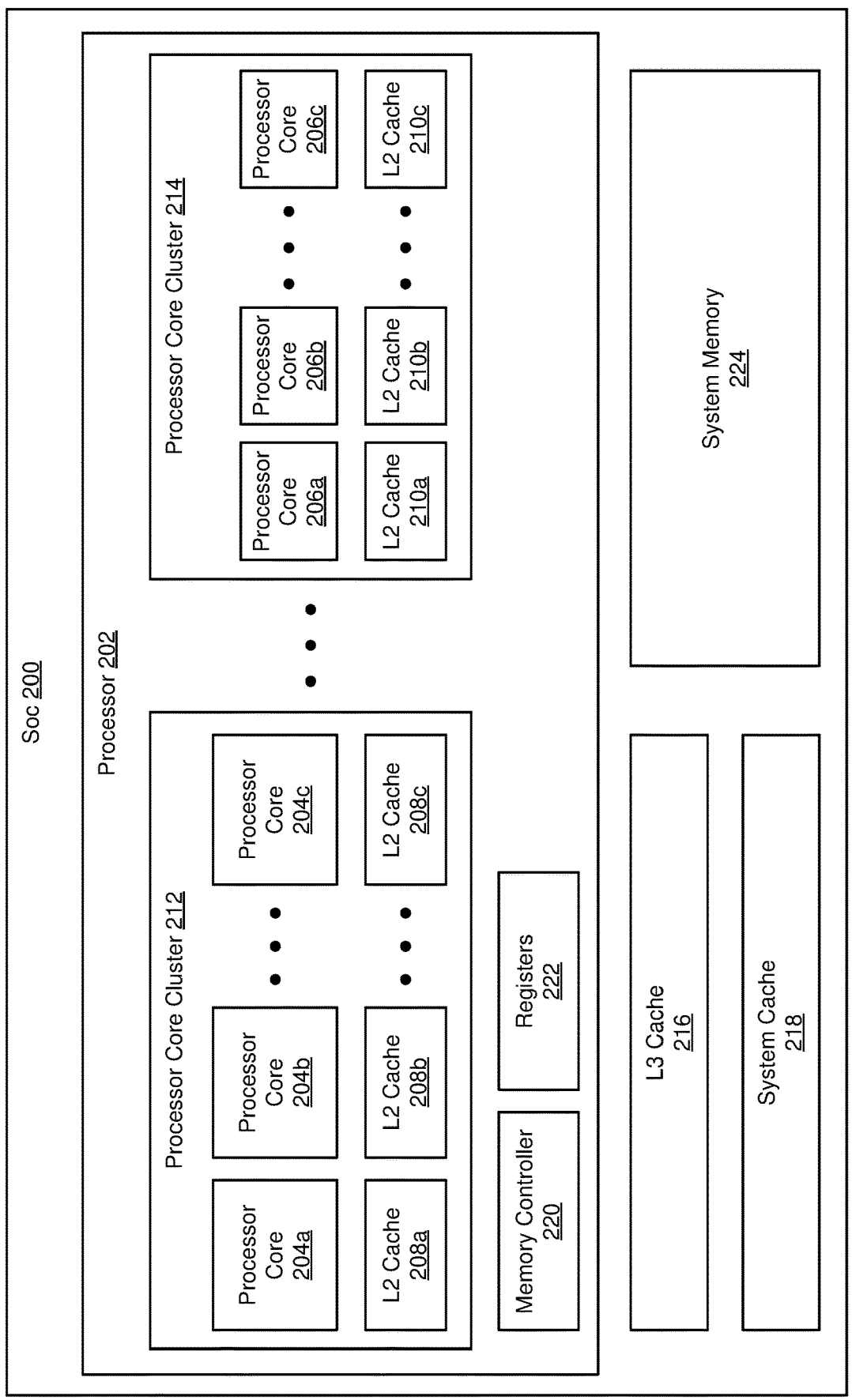
FIG. 2 is a component block diagram illustrating an example system on chip suitable for implementing various embodiments.

FIG. 2 illustrates an example SoC suitable for implementing various embodiments. With reference to FIGS. 1 and 2 an SoC 200 (e.g., SoC 102 in FIG. 1), may include various combinations of components, including any number and combination of processors 202 (e.g., CPU 104, processor 124 in FIG. 1), an L3 cache 216 (e.g., memory 106 in FIG. 1), a system cache 218 (e.g., memory 106 in FIG. 1), and/or a system memory 224 (e.g., memory 106 in FIG. 1).

A processor 202 of may include any number and combination of processor cores 204a, 204b, 204c, 206a, 206b, 206c. For example, a multicore processor 202 may have a plurality of homogeneous or heterogeneous processor cores 204a, 204b, 204c, 206a, 206b, 206c. A homogeneous multi-core processor may include a plurality of homogeneous processor cores. The processor cores 204a, 204b, 204c, 206a, 206b, 206c may be homogeneous in that, the processor cores 204a, 204b, 204c, 206a, 206b, 206c of the multicore processor 202 may be configured for the same purpose and have the same or similar performance characteristics. For example, the multicore processor 202 may be a general purpose processor, and the processor cores 204a, 204b, 204c, 206a, 206b, 206c may be homogeneous general purpose processor cores. As another example, the multicore processor 202 may be a graphics processing unit or a digital signal processor, and the processor cores 204a, 204b, 204c, 206a, 206b, 206c may be homogeneous graphics processor cores or digital signal processor cores, respectively.

A heterogeneous multicore processor may include a plurality of heterogeneous processor cores. The processor cores 204a, 204b, 204c, 206a, 206b, 206c may be heterogeneous in that the processor cores 204a, 204b, 204c, 206a, 206b, 206c of the multicore processor 202 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores.

Processor cores 204a, 204b, 204c, 206a, 206b, 206c may be grouped together as processor core clusters 212, 214. Generally, processor core clusters 212, 214 may include homogeneous processor cores within each processor core clusters 212, 214. Processor core clusters 212, 214 may be homogeneous or heterogeneous with other processor core clusters 212, 214. For example processor core clusters 212, 214 may be homogeneous having the same processor cores as each other. As another example, processor core clusters 212, 214 may be heterogeneous having the different processor cores from each other. For ease of explanation, the terms "processor," "processor core," and "processor core cluster" may be used interchangeably herein.

The processor 202 may further include any number and combination of L2 caches 208a, 208b, 208c, 210a, 210b, 210c (e.g., memory 106 in FIG. 1). For example, each processor core cluster 212, 214 and/or each processor core 204a, 204b, 204c, 206a, 206b, 206c may have a dedicated L2 cache 208a, 208b, 208c, 210a, 210b, 210c. Each L2 cache 208a, 208b, 208c, 210a, 210b, 210c may be designated for read and/or write access by a designated processor core cluster 212, 214 and/or processor core 204a, 204b, 204c, 206a, 206b, 206c. The L2 cache 208a, 208b, 208c, 210a, 210b, 210c may store data and/or instructions, and make the stored data and/or instructions available to the designated processor core cluster 212, 214 and/or processor core 204a, 204b, 204c, 206a, 206b, 206c. The L2 caches 208a, 208b, 208c, 210a, 210b, 210c may include volatile memory as described herein with reference to memory 106 of FIG. 1.

The L3 cache 216, the system cache 218, and the system memory 224 may be shared by and configured for read and/or write access by the processor core clusters 212, 214 and/or the processor cores 204a, 204b, 204c, 206a, 206b, 206c. The L3 cache 216, the system cache 218, and the system memory 224 may store data and/or instructions, and make the stored data and/or instructions available to the processor core clusters 212, 214 and/or the processor cores 204a, 204b, 204c, 206a, 206b, 206c. The L3 cache 216, the system cache 218, and/or the system memory 224 may function as a buffer for data and/or instructions input to and/or output from the processor 202. The L3 cache 216, the system cache 218, and the system memory 224 may include volatile memory as described herein with reference to memory 106 of FIG. 1.

The processor 202 may include a memory controller 220 configured to manage memory accesses to the L2 cache 208a, 208b, 208c, 210a, 210b, 210c, the L3 cache 216, and/or the system cache 218. The memory controller may receive memory access commands from the processor cores 204a, 204b, 204c, 206a, 206b, 206c, and allow and implement and/or deny memory access to the cache 208a, 208b, 208c, 210a, 210b, 210c, 216, 218. The memory controller 220 may be configured to implement cache maintenance, cache coherency, and/or cache replacement policies. The memory controller 220 may be configured to implement virtual cache address translation.

The processor 202 may include any number and combination of registers 222 that may be configured to temporarily store small amounts of data. Registers 222 may be implemented in hardware and/or as memory locations in a cache 208a, 208b, 208c, 210a, 210b, 210c, 216, 218. Any number of registers may be configured to individually and/or in combination to store data for specific purposes associated with the registers 222. For example, a register may store data configured to indicate to the processor 202 information relating to the specific purposes associated with the register 222. As another example, an array of registers 222 may store a data vector for which any number and combination of bits may indicate to the processor 202 information relating to the specific purposes associated with the array of registers 222.

Some or all of the components of the SoC 200 and/or the processor 202 may be arranged differently and/or combined while still supporting the functions of various embodiments. For example, the memory controller 220 may be a component of the SoC 200 that is separate from the processor 202.

Figure 3A:
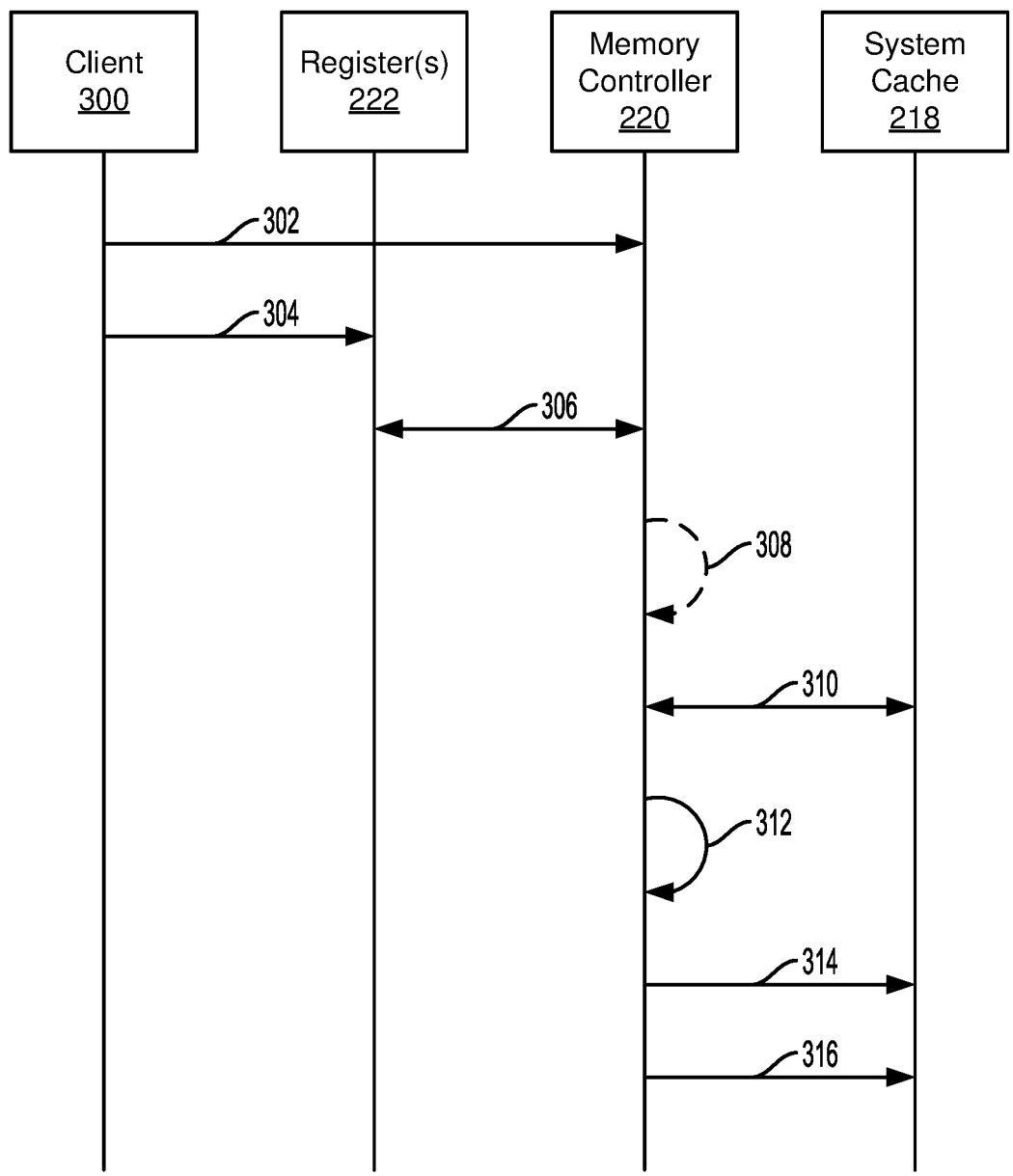
FIGS. 3A and 3B are process component signaling diagrams illustrating examples of criterion aware cache replacement policy according to an embodiment.
Figure 3B:
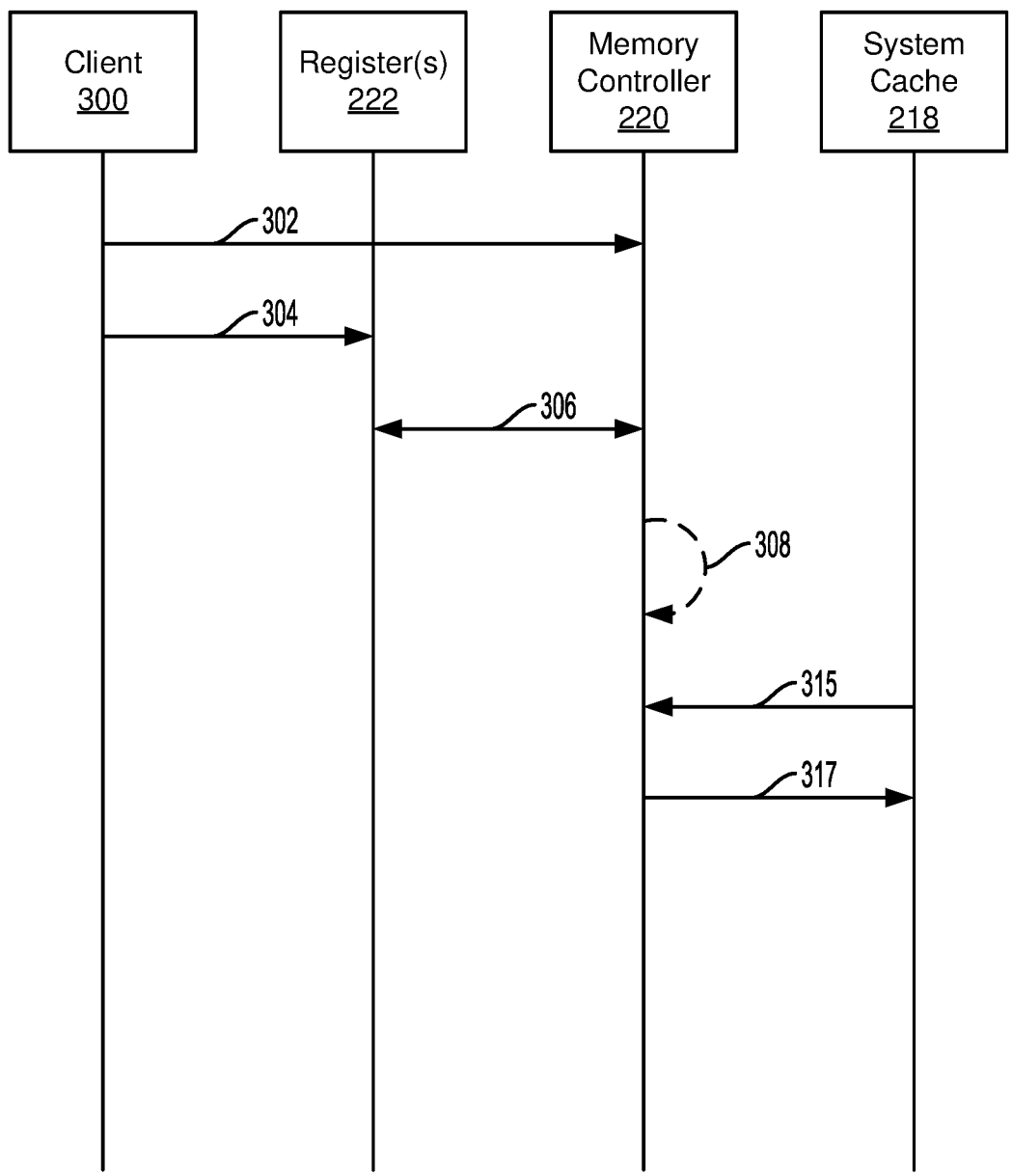

FIGS. 3A and 3B illustrate components and signaling for an example of a criterion aware cache replacement policy according to various embodiments. With reference to FIGS. 1-3, the processor (e.g., CPU 104, processor 124 in FIG. 1, processor 202, processor core 204a, 204b, 204c, 206a, 206b, 206c, processor core cluster 212, 214 in FIG. 2) may implement a client 300 that may issue memory access command to the system cache 218. For example, the processor may be the client 300. As another example, the processor may execute a process of a software program that may be the client 300, such as an operating system and/or an application.

In the example illustrated in FIG. 3A, the client 300 may issue a memory access command 302, such as a write memory command, to the system cache that may be received by the memory controller 220. The client 300 may also implement a register write 304 to one or more registers 222 that may set a staling counter update value in the registers 222. The registers 222 may be associated with a staling counter update feature for a criterion aware cache replacement policy. The value stored in the registers 222 may be configured to indicate to the memory controller 220 whether to update a staling counter (not shown) configured for use by the criterion aware cache replacement policy. For example, the register write 304 may set the staling counter update value to a "1" value configured to indicate to the memory controller 220 to update the staling counter. The client 300 may implement the register write 304 based on the criterion for the criterion aware cache replacement policy. In various embodiments, the criterion may be a time-based criterion, an event-based criterion, or another type of criterion. As examples of time-based criteria, the client 300 may implement the register write 304 based on a time period, a number of processor clock cycles, a number of executed instructions, etc. As an example of an event-based criterion, the client 300 may implement the register write 304 based on completion, suspension, and/or termination of a task, processes, and/or application, start, restart, and/or loading of a task, process, and/or application, an interrupt signal, an error and/or fault signal, etc. As examples other criterion, the client 300 may implement the register write 304 based on a particular state or change in state, such as a power state, security state, availability state, etc. of a processor (e.g., CPU 104, processor 124 in FIG. 1, processor 202 in FIG. 2), a memory (e.g., memory 106, 114 in FIG. 1, cache 208*a*, 208*b*, 208*c*, 210*a*, 210*b*, 210*c*, 216, 218 in FIG. 2), peripheral device (e.g., peripheral device 122 in FIG. 1), communication component (e.g., communication component 112), etc. As another example, the client 300 may implement the register write 304 based on a beginning and/or an end of a portion of data, such as a frame of compressed multimedia data based on a frame time boundary, a color field within a frame of compressed multimedia data, etc.

In response to receiving the write memory command 302, the memory controller 220 may read 306 the registers 222 to determine whether to update the staling counter. The memory controller 220 may retrieve the value of the registers 222 and determine whether the value from the register indicates to the memory controller 220 to update the staling counter.

In response to determining that the value of the registers 222 indicates to the memory controller 220 to update the staling counter, the memory controller 220 may update the staling counter 308. The staling counter may include a value stored in memory (e.g., memory 106, memory 114 in FIG. 1, L2 cache 208*a*, 208*b*, 208*c*, 210*a*, 210*b*, 210*c*, L3 cache 216 in FIG. 2, system cache 218, registers 222 in FIGS. 2 and 3) that may be read and write accessible by the memory controller 220. The memory controller 220 may update the staling counter by any mathematical operation, algorithmic operation, heuristic operation, etc., such as by incrementing and/or decrementing the staling counter. In response to determining that the value of the registers 222 indicates to the memory controller 220 not to update the staling counter, the memory controller 220 may forego updating the staling counter 308.

The memory control 220 may read 310 a local counter for data for locations in the system cache 218. The value of the local counter may include a value of the staling counter stored in association with the associated data is written to the system cache 218 in response to a previous write memory command. In an example, the memory controller 220 may read one or more local counter values stored with a cache tag for memory locations targeted by the write memory command. In another example, the memory controller 220 may read one or more local counter values for locations within a block, partition, a whole, and/or any other portion of the system cache 218.

The memory controller 220 may use the retrieved value of the local counter to aid in determining which portions of the system cache 218 to replace according to the criterion aware cache replacement policy when implementing the write memory command. In operation 312 the memory controller 220 may calculate and compare a replacement value with a staling threshold. For example, the memory controller 220 may use arithmetic operations to generate the replacement value using the value of the local counter and the staling counter value. For example, the memory controller 220 may subtract the value of the local counter from the value of the staling counter to determine the replacement value. The memory controller 220 may compare the replacement value and the staling threshold to determine whether to replace the data associated with the local counter value. The staling threshold may be a preconfigured value. For example, the staling threshold may be preconfigured based on the criterion aware cache replacement policy. As another example, the staling threshold may be preconfigured based on the size, state, usage, availability, etc. of the system cache 218. As another example, the staling threshold may be preconfigured based on the state, usage, power availability, etc. of the processor and/or computing device (e.g., computing device 100 in FIG. 1). As another example, the staling threshold may be preconfigured based on the task, processes, and/or application that is and/or executed by the client 300.

A result of the comparison of the replacement value and the staling threshold may indicate to the memory controller 220 whether the criterion aware cache replacement policy should replace the data associated with the local counter value. For example, in response to the replacement value being greater than or equal to the staling threshold, the memory controller 220 may implement the criterion aware cache replacement policy to replace the data associated with the local counter value with the data of the write memory command. The memory controller 220 may replace the data associated with the local counter value by writing 314 the data of the write memory command to the locations in the system cache 218 storing the data associated with the local counter. Otherwise, the memory controller 220 may write 314 the data of the write memory command to other locations in the system cache 218. The memory controller 220 may also write 316 the value of the staling counter as the local counter to the system cache 218 in association with the data of the write memory command written to the system cache 218. For example, the memory controller 220 may write 316 the value of the staling counter to a tag location in the system cache 218 associated with the data of the write memory command written to the system cache 218.

In the example illustrated in FIG. 3B, the client 300 may issue a memory access command 302, such as a read memory command, to the system cache that may be received by the memory controller 220. The client 300 may also implement a register write 304 to one or more registers 222 that may set a staling counter update value in the registers 222. In response to receiving the read memory command 302, the memory controller 220 may read 306 the registers 222 to determine whether to update the staling counter. In response to determining that the value of the registers 222 indicates to the memory controller 220 to update the staling counter, the memory controller 220 may update the staling counter 308. The memory controller 220 may read the data associated with the local counter value by reading 315 the data at the locations in the system cache 218 storing the data associated with the local counter and targeted by the read memory command. The memory controller 220 may also write 317 the value of the staling counter as the local counter to the system cache 218 in association with the data at the locations in the system cache 218 targeted by the read memory command. For example, the memory controller 220 may write 317 the value of the staling counter to a tag location in the system cache 218 associated with the data at the locations in the system cache 218 targeted by the read memory command.

The order of the signals 302, 304, 308, 310, 312, 314, 316 in FIG. 3A and of the signals 302, 304, 308, 315, 317 in FIG. 3B are merely examples, and the order of the signals 302, 304, 308, 310, 312, 314, 315, 316, 317 may be performed in a different order. For example, the order of signals 302 and 304, of signals 314 and 316, and/or of signals 315 and 317 may be reversed. As another example, the signals 302 and 304, the signals 314 and 316, and/or the signals 315 and 317 may be transmitted concurrently.

Figure 4:
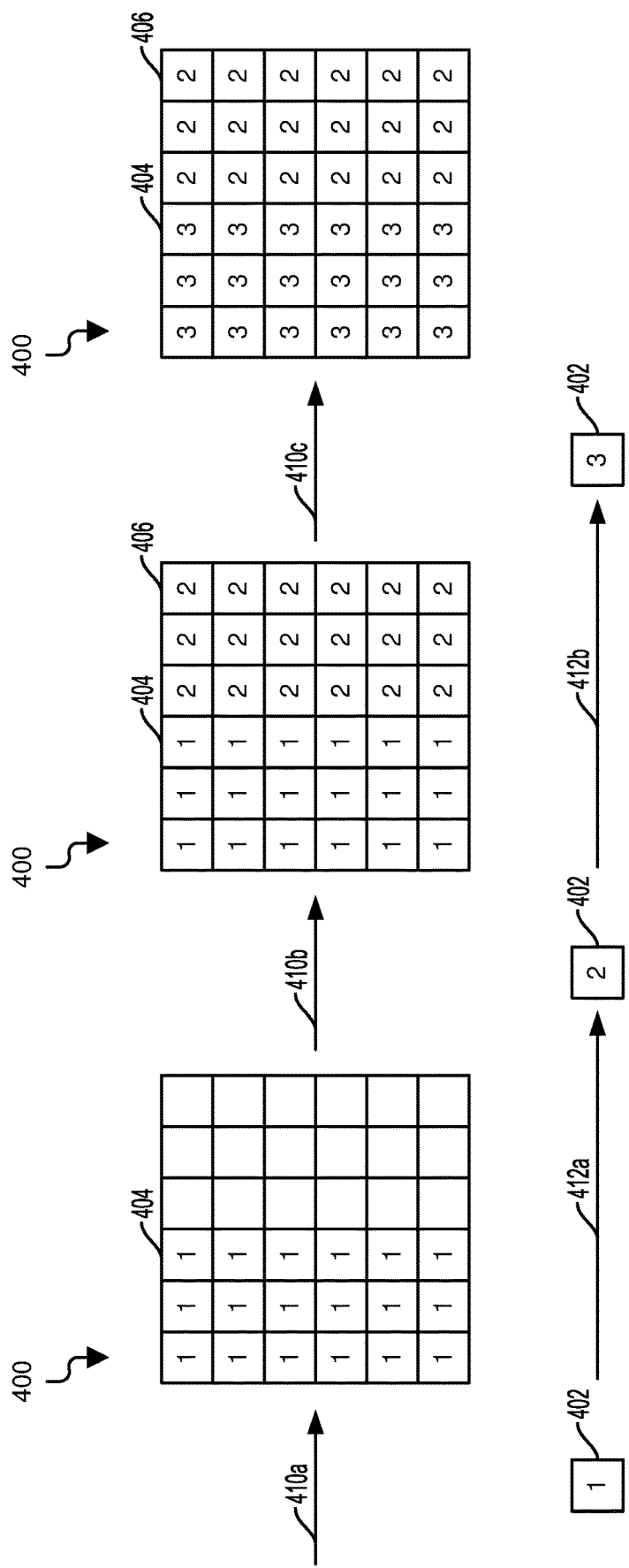
FIG. 4 is a memory flow diagram illustrating an example of criterion aware cache replacement policy according to an embodiment.

FIG. 4 illustrates an example of a memory flow for implementing a criterion aware cache replacement policy according to an embodiment. With reference to FIGS. 1-4, the memory controller (e.g., memory controller 220 in FIGS. 2 and 3) may implement write memory commands 410a, 410b, 410c in the system cache 400 (e.g., system cache 218 in FIGS. 2 and 3), and implement staling counter updates 412a, 412b of the staling counter 402. The write memory commands 410a, 410b, 410c may be issued by a client (e.g., client 300) of the computing device (e.g., computing device 100 in FIG. 1).

A write memory command 410a may be received by the memory controller and prompt the memory controller to write data to the system cache 400. The staling counter 402 at the time of implementing the write memory command 410a may be "1." Data of the write memory command 410a may be written to the system cache 400 along with the staling counter value "1" as the local counter associated with the locations 404 in the system cache at which the data is written.

Another write memory command 410b may be received by the memory controller and may prompt the memory controller to write data to the system cache 400 and the staling counter may be updated 412a in response to a register value read by the memory controller from a register (e.g., register 222 in FIGS. 2 and 3). The register value may be set by a register write (e.g., register write 304 in FIG. 3) implemented by the client in conjunction with the write memory command 410b. The staling counter 402 at the time of implementing the write memory command 410c may be "2." Data of the write memory command 410b may be written to the system cache 400 along with the staling counter value "2" as the local counter associated with the locations 406 in the system cache at which the data is written. In this example, the locations 406 may be open locations prior to the data of the write memory command 410b and the local counter being written to the locations 406. The write memory command 410b may prompt the criterion aware cache replacement policy to check the system cache 400 of data to be replaced, but no replacement may be implemented in the system cache 400. Replacement may not be enacted for data that does not satisfy the criterion of the criterion aware cache replacement policy. For example, the criterion aware cache replacement policy may determine whether a difference between the local counter for the locations 404 in the system cache 400 at which data has been written ("1" in this example) and the staling counter 402 at the time of the write memory command 410b ("2" in this example) may be less than a staling threshold.

Another write memory command 410c may be received by and may prompt the memory controller to write data to the system cache 400 and the staling counter may be updated 412b in response to a register value read by the memory controller. The register value may be set by a register write (e.g., register write 304 in FIG. 3) implemented by the client in conjunction with the write memory command 410c. The staling counter 402 at the time of implementing the write memory command 410c may be "3." Data of the write memory command 410c may be written to the system cache 400 along with the staling counter value "3" as the local counter associated with the locations 404 in the system cache at which the data is written. In this example, the locations 404 may be occupied locations prior to the data of the write memory command 410c and the local counter being written to the locations 404. The write memory command 410b may prompt the criterion aware cache replacement policy to check the system cache 400 of data to be replaced. In this example replacement may be implemented in the system cache 400 for some locations 404 and not other locations 406. Replacement may not be enacted for data that does not satisfy the criterion of the criterion aware cache replacement policy. For example, the criterion aware cache replacement policy may determine whether a difference between the local counter for the locations 406 in the system cache 400 at which data has been written ("2" in this example) and the staling counter 402 at the time of the write memory command 410c ("3" in this example) may be less than a staling threshold. Replacement may be enacted for data that does satisfy the criterion of the criterion aware cache replacement policy. For example, the criterion aware cache replacement policy may determine whether a difference between the local counter for the locations 404 in the system cache 400 at which data has been written ("1" in this example) and the staling counter 402 at the time of the write memory command 410c ("3" in this example) may be greater than or equal to the staling threshold. The memory controller may replace the data and local counters for locations 404 with data and the value of the staling counter for the write memory command 410c.

Figure 5:
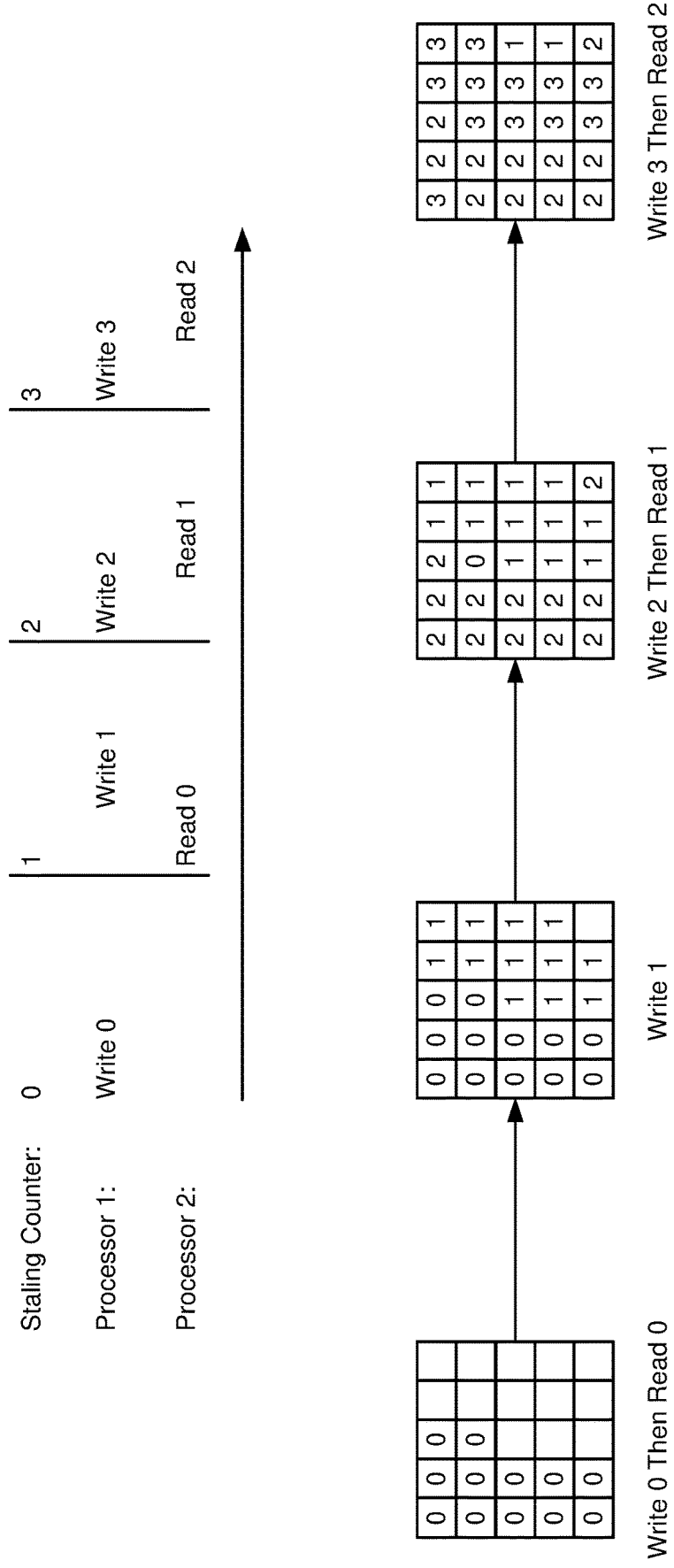
FIG. 5 is a memory flow diagram illustrating an example of criterion aware cache replacement policy replacing data based on a value of a local counter according to an embodiment.

FIG. 5 illustrates an example of a memory flow for implementing a criterion aware cache replacement policy according to an embodiment. With reference to FIGS. 1-5, the memory controller (e.g., memory controller 220 in FIGS. 2 and 3) may implement write memory commands (Write N) and read memory commands (Read N) in the system cache (e.g., system cache 218 in FIGS. 2 and 3, system cache 400 in FIG. 4). The write memory commands and read memory commands may be issued by a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) (e.g., Processor 1 and Processor 2 in FIG. 5) of the computing device (e.g., computing device 100 in FIG. 1).

At a time for a Write 0 write memory command from Processor 1, the staling counter may have a value of "0." Data of the Write 0 may be written to the system cache along with the staling counter value "0" as the local counter associated with the data of the Write 0.

The Write 0 may be followed by a Read 0 read memory command from Processor 2. The memory controller may read out the data in the system cache targeted by the Read 0. For example, the memory controller may read out the data at locations in the system cache associated with a local counter value of "0."

The Read 0 may be followed by a Write 1 write memory command from Processor 1. The staling counter may have been updated and may have a value of "1" at the time of the Write 1. The Write 1 may prompt the criterion aware cache replacement policy to check for stale data by comparing local counters associated with the data in the system cache with a staling threshold. For example, the memory controller may read local counters from the system cache, calculate a difference between the value of the staling counter and the value of the local counter, and compare the difference to the staling threshold. In response to the difference being less than the staling threshold, the criterion aware cache replacement policy may determine to not replace the data associated with the local counter in the system cache, as in the example of the Write 1. In this example, data of the Write 1 along with the staling counter value "2" as the local counter associated with the data of the Write 1 may be written to open locations in the system cache.

The Write 1 may be followed by a second (i.e., Write 2) write memory command from Processor 1. The staling counter may have been updated and may have a value of "2" at the time of the Write 2. The Write 2 may prompt the criterion aware cache replacement policy to check for stale data by comparing local counters associated with the data in the system cache with a staling threshold. For example, the memory controller may read local counters from the system cache, calculate a difference between the value of the staling counter and the value of the local counter, and compare the difference to the staling threshold. In response to the difference being less than the staling threshold, the criterion aware cache replacement policy may determine to not replace the data associated with the local counter in the system cache. In response to the difference being greater than or equal to the staling threshold, the criterion aware cache replacement policy may determine to replace the data associated with the local counter in the system cache. In this example, the data associated with the local counter having the value "0" may be determined to be stale because the difference between the staling counter and the local counter may be greater than or equal to the staling threshold. As a result, the criterion aware cache replacement policy may determine to replace the data associated with the local counter having the value "0." The data associated with the local counter having the value "1" may be determined not to be stale because the difference between the staling counter and the local counter is less than the staling threshold. As a result, the criterion aware cache replacement policy may determine not to replace the data associated with the local counter having the value "2." The data of the Write 2 along with the staling counter value "2" as the local counter associated with the data of the Write 2 may be written to open locations in the system cache and locations occupied with data associated with a local counter value of "0."

The Write 2 may be followed by a Read 1 read memory command from Processor 2. The memory controller may read out the data in the system cache targeted by the Read 1. For example, the memory controller may read out the data at locations in the system cache associated with a local counter value of "1."

The Read 1 may be followed by a Write 3 write memory command from Processor 1. The staling counter may have been updated and may have a value of "3" at the time of the Write 3. The Write 3 may prompt the criterion aware cache replacement policy to check for stale data by comparing local counters associated with the data in the system cache with a staling threshold. For example, the memory controller may read local counters from the system cache, calculate a difference between the value of the staling counter and the value of the local counter, and compare the difference to the staling threshold. In response to the difference being less than the staling threshold, the criterion aware cache replacement policy may determine to not replace the data associated with the local counter in the system cache. In response to the difference being greater than or equal to the staling threshold, the criterion aware cache replacement policy may determine to replace the data associated with the local counter in the system cache. In this example, the data associated with the local counter having the value "0" or "1" may be determined to be stale because the difference between the staling counter and the local counter may be greater than or equal to the staling threshold. As a result, the criterion aware cache replacement policy may determine to replace the data associated with the local counter having the value "0" or "1". The data associated with the local counter having the value "2" may be determined not to be stale because the difference between the staling counter and the local counter may be less than the staling threshold. As a result, the criterion aware cache replacement policy may determine not to replace the data associated with the local counter having the value "2." However, the criterion aware cache replacement policy may not control all replacements of data in the system cache. For example, mechanisms for writing data to the system cache may be defined in a manner that may, under certain circumstance, not completely align with the criterion aware cache replacement policy. The data of the Write 3 along with the staling counter value "3" as the local counter associated with the data of the Write 2 may be written to locations in the system cache occupied with data associated with a local counter value of "0" or "1." However, the mechanism for writing data to the system cache may write data in a manner determined by a number of lines in a set. As such, circumstances may arise in which data that is not stale under the criterion aware cache replacement policy, such as data associated with a local counter value of "2", may be replaced by the Write 3.

The Write 3 may be followed by a Read 2 read memory command from Processor 2. The memory controller may read out the data in the system cache targeted by the Read 2. For example, the memory controller may read out the data at locations in the system cache associated with a local counter value of "2." While the data targeted by the Read 2 may be, in part, replaced by the data written to the system cache by the Write 3, by contrast with other cache replacement policies, such as not-most recently used (nMRU) and capacity based first-in, first-out (FIFO), the criterion aware cache replacement policy enables a higher hit rate (or lower miss rate) for data in the system cache.

Figure 6:
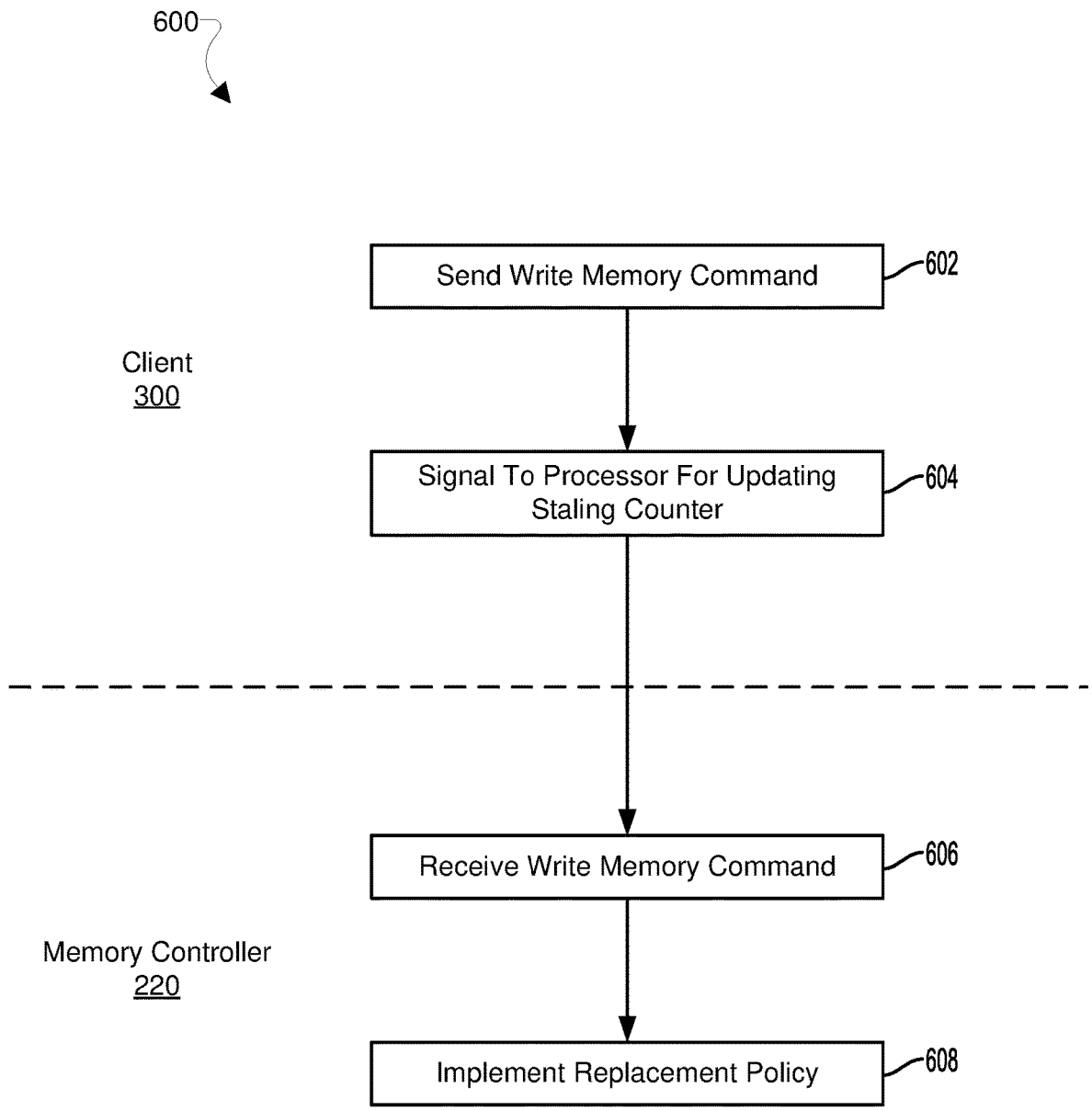
FIG. 6 is a process flow diagram illustrating a method for implementing criterion aware cache replacement policy of a local counter according to an embodiment.

FIG. 6 illustrates a method 600 for implementing criterion aware cache replacement policy according to some embodiments. With reference to FIGS. 1-6, the method 600 may be implemented in a computing device (e.g., computing device 100 in FIG. 1), in hardware, in software (e.g., client 300 in FIG. 3) executing in a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3), or in a combination of a software-configured processor and dedicated hardware that includes other individual components, such as various memories/caches (e.g., memory 106, memory 114 in FIG. 1, L2 cache 208a, 208b, 208c, 210a, 210b, 210c, L3 cache 216 in FIG. 2, system cache 218, registers 222 in FIGS. 2 and 3, system cache 400 in FIG. 4) and various memory/cache controllers (e.g., memory controller 220 in FIGS. 2 and 3). In order to encompass the alternative configurations enabled in various embodiments, the hardware implementing the method 600 is referred to herein as a "client" and a "memory control device."

In block 602, a client may send a write memory command targeted at a system cache (e.g., system cache 218, in FIGS. 2 and 3, system cache 400 in FIG. 4). In block 604, the client may signal to a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) for updating a staling counter for data in the system cache. Signaling to the processor may be accomplished using various types of signal communication, including, for example, a register write to a register (e.g., register 222 in FIGS. 2 and 3), a direct interrupt to the processor, etc. The register may be associated with a staling counter update feature for a criterion aware cache replacement policy. Writing to the register may set a value of the register configured to indicate to a memory control device whether to update the staling counter. In some embodiments, the client sending the write memory command in block 602 and signaling to the processor for updating the staling counter for data in the system cache in block 604 may be a processor (e.g., CPU 104, processor 124 in FIG. 1, processor 202, processor core 204*a*, 204*b*, 204*c*, 206*a*, 206*b*, 206*c*, processor core cluster 212, 214 in FIG. 2, client 300 in FIG. 3) and/or a software program (e.g., client 300 in FIG. 3), such as an operating system and/or an application.

In block 606, a memory control device may receive the write memory command. The memory control device may be configured to manage, control, and/or implement memory access, cache maintenance, cache coherency, and/or cache replacement policies for the system cache. In block 608, the memory control device may implement a criterion aware cache replacement policy for writing data of the write memory command in the system cache. The memory control device receiving the write memory command in block 606 and implementing the criterion aware cache replacement policy in block 608 may be a processor (e.g., CPU 104, processor 124 in FIG. 1, processor 202, processor core 204*a*, 204*b*, 204*c*, 206*a*, 206*b*, 206*c*, processor core cluster 212, 214 in FIG. 2, client 300 in FIG. 3) and/or a memory controller (e.g., memory controller 220 in FIGS. 2 and 3).

Figure 7:
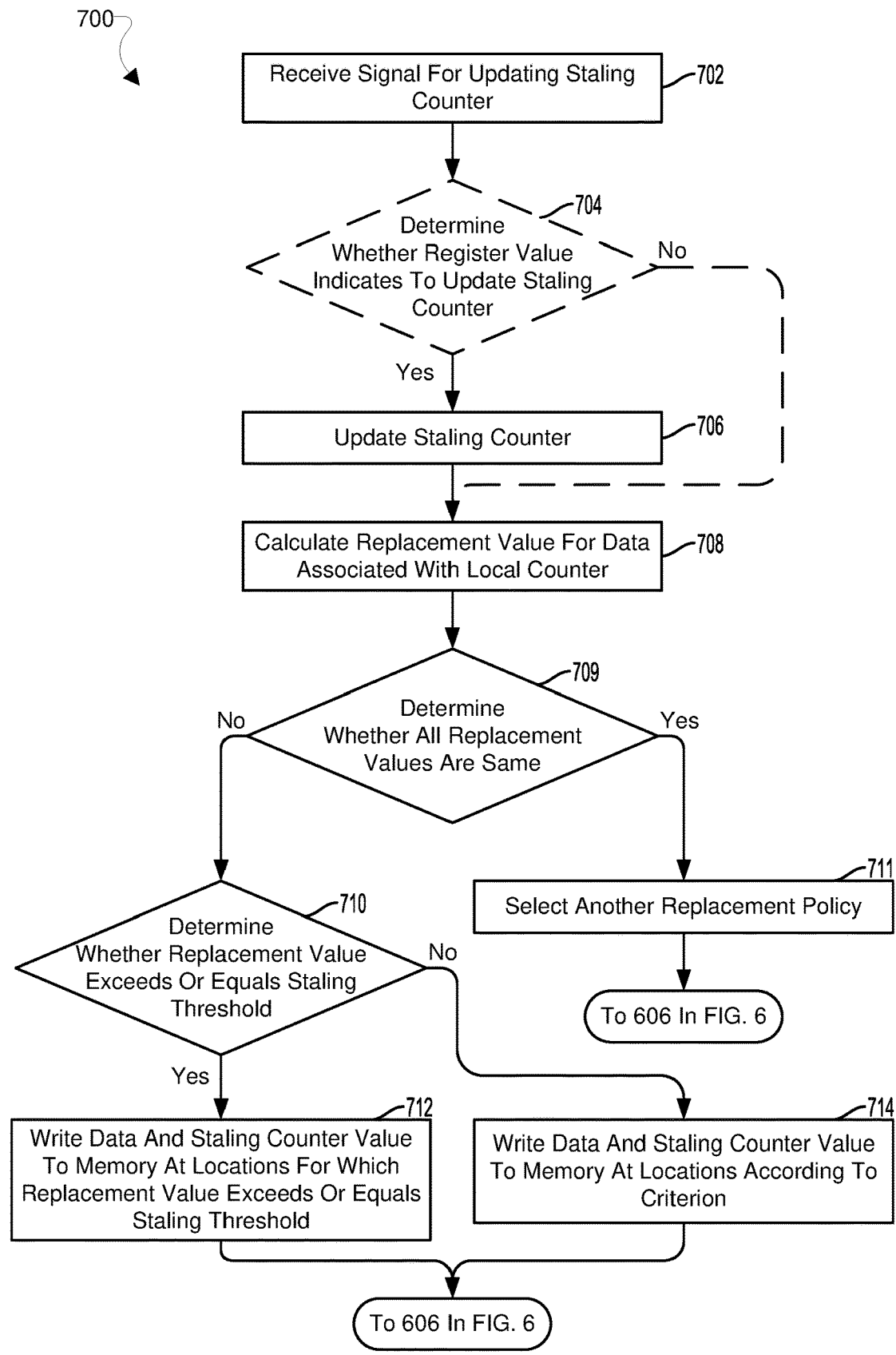
FIG. 7 is a process flow diagram illustrating a method for implementing criterion aware cache replacement policy replacing data based a value of a local counter according to an embodiment.

FIG. 7 illustrates a method 700 for implementing criterion aware cache replacement policy replacing data based a value of a local counter according to some embodiments. With reference to FIGS. 1-7, the method 700 may be implemented in a computing device (e.g., computing device 100 in FIG. 1), in hardware, in software (e.g., client 300 in FIG. 3) executing in a processor (e.g., CPU 104, processor 124 in FIG. 1, processor 202, processor core 204*a*, 204*b*, 204*c*, 206*a*, 206*b*, 206*c*, processor core cluster 212, 214 in FIG. 2, client 300 in FIG. 3), or in a combination of a software-configured processor and dedicated hardware that includes other individual components, such as various memories/caches (e.g., memory 106, memory 114 in FIG. 1, L2 cache 208*a*, 208*b*, 208*c*, 210*a*, 210*b*, 210*c*, L3 cache 216 in FIG. 2, system cache 218, registers 222 in FIGS. 2 and 3, system cache 400 in FIG. 4) and various memory/cache controllers (e.g., memory controller 220 in FIGS. 2 and 3). In order to encompass the alternative configurations enabled in various embodiments, the hardware implementing the method 700 is referred to herein as a "memory control device." Blocks 702-714 of the method 700 expand on operations that may be performed in block 608 of the method 600 described with reference to FIG. 6.

In block 702, the memory control device may receive a signal for updating a staling counter for data in the system cache (e.g., system cache 218, in FIGS. 2 and 3, and system cache 400 in FIG. 4). For example, the memory control device may read a register (e.g., register 222 in FIGS. 2 and 3), receive a direct interrupt, etc. for updating a staling counter for data in the system cache. The register may be associated with a staling counter update feature for a criterion aware cache replacement policy and may have a value configured to indicate to the memory control device whether to update the staling counter. The value of the register may be set, for example, by writing to the register for updating the staling counter for data in the system cache as described for block 604 of the method 600 (FIG. 6). The memory control device may read the value of the value of the register for updating the staling counter. In some embodiments, the memory control device receiving the signal for updating the staling counter for data in the system cache in block 702 may be a processor (e.g., CPU 104, processor 124 in FIG. 1, processor 202, processor core 204*a*, 204*b*, 204*c*, 206*a*, 206*b*, 206*c*, processor core cluster 212, 214 in FIG. 2, client 300 in FIG. 3) and/or a memory controller (e.g., memory controller 220 in FIGS. 2 and 3).

In optional determination block 704, the memory control device may interpret the register value read in block 702 to determine whether the register value indicates that the memory control device should update the staling counter. The value stored in the register may be configured to indicate to the memory control device whether to update the staling counter. For example, the register value may be set to a "1" value to indicate to the memory control device that the staling counter should be updated, and set to a "0" value to indicate to the memory control device that the staling counter should not be updated, or vice versa. In some embodiments, the memory control device may read the value of the value of the register for updating the staling counter. In some embodiments, the memory control device determining whether the register value indicates to the memory control device to update the staling counter in optional determination block 704 may be the processor and/or the memory controller.

Following receiving the signal for updating the staling counter for data in the system cache in block 702; or in response to determining that the register value indicates to the memory control device to update the staling counter (i.e., optional determination block 704="Yes"), the memory control device may update the staling counter in block 706. In some embodiments, updating the staling counter in block 706 may be performed when (i.e., at the time) data is written to the system cache. The staling counter may include a value stored in memory (e.g., memory 106, memory 114 in FIG. 1, L2 cache 208*a*, 208*b*, 208*c*, 210*a*, 210*b*, 210*c*, L3 cache 216 in FIG. 2, system cache 218, registers 222 in FIGS. 2 and 3, system cache 400 in FIG. 4) that may be read and write accessible by the memory control device. Updating the staling counter may be implemented by any mathematical operation, algorithmic operation, heuristic operation, etc., such as by incrementing and/or decrementing the staling counter. In some embodiments, the memory control device updating the staling counter in block 706 may be the processor and/or the memory controller.

In response to determining that the register value indicates to the memory control device not to update the staling counter (i.e., optional determination block 704="No"); or following updating the staling counter in block 706, the memory control device may calculate a replacement value for data associated with a local counter in block 708. In some embodiments, the memory control device calculating the replacement value for data associated with a local counter in block 708 may be the processor and/or the memory controller. The local counter may include a value of the staling counter stored in association with data written to the system cache in response to a previous write memory command. In an example, the memory control device may read one or more local counter values stored with a cache tag for memory locations targeted by the write memory command received in block 606 of the method 600 described with reference to FIG. 6. In another example, the memory control device may read one or more local counter values for locations within a block, a partition, a whole, and/or any other portion of the system cache.

The staling threshold may be a preconfigured value. For example, the staling threshold may be preconfigured based on the criterion aware cache replacement policy. As another example, the staling threshold may be preconfigured based on the size, state, usage, availability, etc. of the system cache. As another example, the staling threshold may be preconfigured based on the state, usage, power availability, etc. of a processor (e.g., CPU 104, processor 124 in FIG. 1, processor 202, processor core 204*a*, 204*b*, 204*c*, 206*a*, 206*b*, 206*c*, processor core cluster 212, 214 in FIG. 2, client 300 in FIG. 3) and/or computing device (e.g., computing device 100 in FIG. 1). As another example, the staling threshold may be preconfigured based on the task, processes, and/or application.

The memory control device may calculate a replacement value with the staling threshold. For example, the memory control device may use arithmetic operations to generate the replacement value using the value of the local counter and the staling counter value. For example, the memory control device may subtract the value of the local counter from the value of the staling counter to determine the replacement value.

In determination block 709, the memory control device may determine whether the replacement values for all data at locations within a block, a partition, a whole, and/or any other portion of the system cache are the same. The memory control device may compare the replacement values calculated in block 708 with each other in determination block 709. For example, the memory control device may determine from the comparison whether the replacement values are equal to each other. In some embodiments, the memory control device determining whether the replacement values for all data at locations within the block, the partition, the whole, and/or any other portion of the system cache are the same in determination block 709 may be the processor and/or the memory controller.

In response to determining that the replacement values for all data at locations within the block, the partition, the whole, and/or any other portion of the system cache are the same (i.e., determination block 709="Yes"), the memory control device may select a cache replacement policy other than the criterion aware cache replacement policy in block 711. For example, the memory control device may select an nMRU, a FIFO, a random, etc. cache replacement policy. In some embodiments, the memory control device selecting the cache replacement policy other than the criterion aware cache replacement policy in block 711 may be the processor and/or the memory controller.

After selecting the cache replacement policy other than the criterion aware cache replacement policy in block 711, the memory control device may receive a write memory command in block 606 of the method 600 as described with reference to FIG. 6. The memory control device receiving the write memory command in block 606 may be the processor and/or a memory controller.

In response to determining that the replacement values for all data at locations within the block, the partition, the whole, and/or any other portion of the system cache are not the same (i.e., determination block 709="No"), the memory control device may determine whether the replacement value exceeds or equals the staling threshold in determination block 710. The memory control device may compare the replacement value calculated in block 708 and the staling threshold to determine whether to replace the data associated with the local counter value. For example, the memory control device may determine from the comparison whether the replacement value exceeds, equals, or exceeds or equals the staling threshold. In some embodiments, the memory control device determining whether the replacement value exceeds or equals the staling threshold in determination block 710 may be the processor and/or the memory controller.

In response to determining that the replacement value exceeds or equals the staling threshold (i.e., determination block 710="Yes"), the memory control device may write the data of the write memory command, received in block 606 of the method 600 (FIG. 6), and the value of the staling counter to memory at locations for which the replacement value exceeds or equals the staling threshold in block 712 of the method 700 (FIG. 7). A result of the comparison of the replacement value and the staling threshold in determination block 710 may indicate to the memory control device whether the criterion aware cache replacement policy should replace the data associated with the local counter value used to calculate the replacement value in block 708. For example, in response to the replacement value exceeding or equaling the staling threshold, the memory control device may implement the criterion aware cache replacement policy to replace the data associated with the local counter value with the data of the write memory command. The memory control device may replace the data associated with the local counter value by writing the data of the write memory command to the locations in the system cache storing the data associated with the local counter. The memory control device may also write the value of the staling counter as the local counter to the system cache in association with the data of the write memory command written to the system cache. For example, the memory control device may write the value of the staling counter to a tag location in the system cache associated with the data of the write memory command written to the system cache. In some embodiments, the memory control device writing the data of the write memory command and the value of the staling counter to the memory at the locations for which the replacement value exceeds or equals the staling threshold in block 712 may be the processor and/or the memory controller.

In response to determining that the replacement value does not exceed or equal the staling threshold (i.e., determination block 710="No"), the memory control device may write the data of the write memory command, received in block 606 of the method 600 (FIG. 6), and the value of the staling counter to memory at locations according to a criterion in block 714. The criterion used to determine where to write the data of the write memory command and the value of the staling counter to the system cache may be any known criterion such as a cache placement policy, cache replacement policy, cache coherency policy, etc. The memory control device may also write the value of the staling counter as the local counter to the system cache in association with the data of the write memory command written to the system cache. For example, the memory control device may write the value of the staling counter to a tag location in the system cache associated with the data of the write memory command written to the system cache. In some embodiments, the memory control device writing the data of the write memory command and the value of the staling counter to the memory at the locations according to the criterion in block 714 may be the processor and/or the memory controller.

Following writing the data of the write memory command and the value of the staling counter to the memory at the locations for which the replacement value exceeds or equals the staling threshold in block 712; or writing the data of the write memory command and the value of the staling counter to the memory at the locations according to the criterion in block 714, the memory control device may receive a write memory command in block 606 of the method 600 as described with reference to FIG. 6. The memory control device receiving the write memory command in block 606 may be the processor and/or a memory controller.

Figure 8:
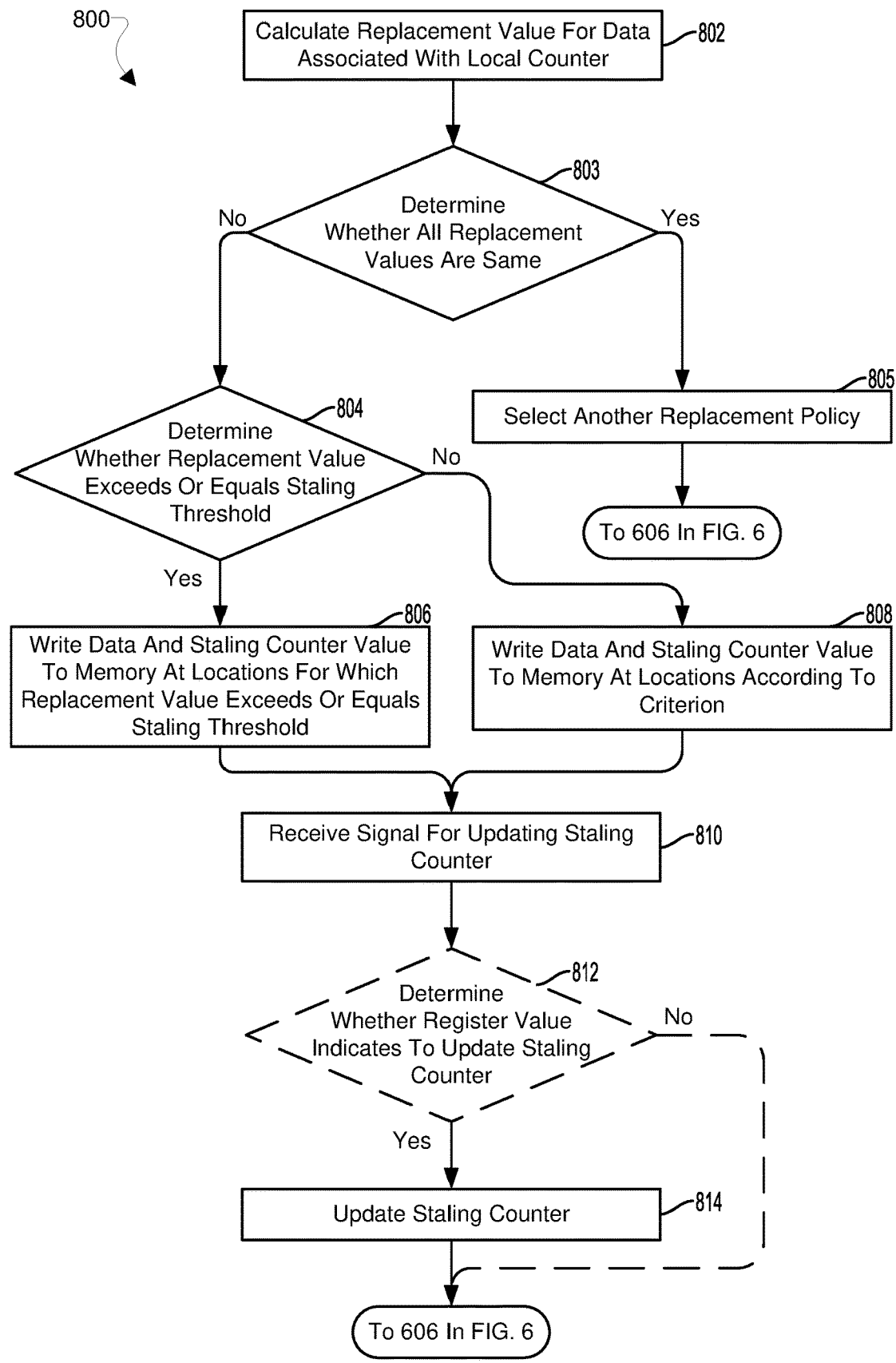
FIG. 8 is a process flow diagram illustrating a method for implementing criterion aware cache replacement policy replacing data based a value of a local counter according to an embodiment.

FIG. 8 illustrates a method 800 for implementing criterion aware cache replacement policy replacing data based a value of a local counter according to some embodiments. With reference to FIGS. 1-8, the method 800 may be implemented in a computing device (e.g., computing device 100 in FIG. 1), in hardware, in software (e.g., client 300 in FIG. 3) executing in a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3), or in a combination of a software-configured processor and dedicated hardware that includes other individual components, such as various memories/caches (e.g., memory 106, memory 114 in FIG. 1, L2 cache 208a, 208b, 208c, 210a, 210b, 210c, L3 cache 216 in FIG. 2, system cache 218, registers 222 in FIGS. 2 and 3, system cache 400 in FIG. 4) and various memory/cache controllers (e.g., memory controller 220 in FIGS. 2 and 3). In order to encompass the alternative configurations enabled in various embodiments, the hardware implementing the method 800 is referred to herein as a "memory control device." Blocks 802-814 of the method 800 expand on operations that may be performed in block 608 of the method 600 described with reference to FIG. 6.

In block 802, the memory control device may calculate a replacement value for data associated with a local counter. In some embodiments, the memory control device calculating the replacement value for data associated with a local counter in block 802 may be a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) and/or a memory controller (e.g., memory controller 220 in FIGS. 2 and 3). The local counter may include a value of a staling counter stored in association with data written to a system cache (e.g., system cache 218, in FIGS. 2 and 3, system cache 400 in FIG. 4) in response to a previous write memory command. The staling counter may include a value stored in memory (e.g., memory 106, memory 114 in FIG. 1, L2 cache 208a, 208b, 208c, 210a, 210b, 210c, L3 cache 216 in FIG. 2, system cache 218, registers 222 in FIGS. 2 and 3, system cache 400 in FIG. 4) that may be read and write accessible by the memory control device. In an example, the memory control device may read one or more local counter values stored with a cache tag for memory locations targeted by the write memory command received in block 606 of the method 600 as described with reference to FIG. 6. In another example, the memory control device may read one or more local counter values for locations within a block, partition, a whole, and/or any other portion of the system cache.

The staling threshold may be a preconfigured value. For example, the staling threshold may be preconfigured based on a criterion aware cache replacement policy. As another example, the staling threshold may be preconfigured based on the size, state, usage, availability, etc. of the system cache. As another example, the staling threshold may be preconfigured based on the state, usage, power availability, etc. of a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) and/or computing device (e.g., computing device 100 in FIG. 1). As another example, the staling threshold may be preconfigured based on the task, processes, and/or application.

The memory control device may calculate a replacement value with the staling threshold. For example, the memory control device may use arithmetic operations to generate the replacement value using the value of the local counter and the staling counter value. For example, the memory control device may subtract the value of the local counter from the value of the staling counter to determine the replacement value.

In determination block 803, the memory control device may determine whether the replacement values for all data at locations within a block, a partition, a whole, and/or any other portion of the system cache are the same. In this determination, the memory control device may compare the replacement values calculated in block 802 with each other. For example, the memory control device may determine from the comparison whether the replacement values are equal to each other. In some embodiments, the memory control device determining whether the replacement values for all data at locations within the block, the partition, the whole, and/or any other portion of the system cache are the same in determination block 803 may be the processor and/or the memory controller.

In response to determining that the replacement values for all data at locations within the block, the partition, the whole, and/or any other portion of the system cache are the same (i.e., determination block 803="Yes"), the memory control device may select a cache replacement policy other than the criterion aware cache replacement policy in block 805. For example, the memory control device may select an nMRU or a FIFO cache replacement policy. In some embodiments, the memory control device selecting the cache replacement policy other than the criterion aware cache replacement policy in block 805 may be the processor and/or the memory controller.

After selecting the cache replacement policy other than the criterion aware cache replacement policy in block 805, the memory control device may receive a write memory command in block 606 of the method 600 as described with reference to FIG. 6. The memory control device receiving the write memory command in block 606 may be the processor and/or a memory controller.

In response to determining that the replacement values for all data at locations within the block, the partition, the whole, and/or any other portion of the system cache are not the same (i.e., determination block 803="No"), the memory control device may determine whether the replacement value exceeds or equals the staling threshold in determination block 804. The memory control device may compare the replacement value calculated in block 802 and the staling threshold to determine whether to replace the data associated with the local counter value. For example, the memory control device may determine from the comparison whether the replacement value exceeds, equals, or exceeds or equals the staling threshold. In some embodiments, the memory control device determining whether the replacement value exceeds or equals the staling threshold in determination block 804 may be the processor and/or the memory controller.

In response to determining that the replacement value exceeds or equals the staling threshold (i.e., determination block 804="Yes"), the memory control device may write the data of the write memory command, received in block 606 of the method 600 (FIG. 6), and the value of the staling counter to memory at locations for which the replacement value exceeds or equals the staling threshold in block 806. A result of the comparison of the replacement value and the staling threshold in determination block 804 may indicate to the memory control device whether the criterion aware cache replacement policy should replace the data associated with the local counter value used to calculate the replacement value in block 802. For example, in response to the replacement value exceeding or equaling the staling threshold, the memory control device may implement the criterion aware cache replacement policy to replace the replace the data associated with the local counter value with the data of the write memory command. The memory control device may replace the data associated with the local counter value by writing the data of the write memory command to the locations in the system cache storing the data associated with the local counter. The memory control device may also write the value of the staling counter as the local counter to the system cache in association with the data of the write memory command written to the system cache. For example, the memory control device may write the value of the staling counter to a tag location in the system cache associated with the data of the write memory command written to the system cache. In some embodiments, the memory control device writing the data of the write memory command and the value of the staling counter to the memory at the locations for which the replacement value exceeds or equals the staling threshold in block 806 may be the processor and/or the memory controller.

In response to determining that the replacement value does not exceed or equal the staling threshold (i.e., determination block 804="No"), the memory control device may write the data of the write memory command, received in block 606 of the method 600 (FIG. 6), and the value of the staling counter to memory at locations according to a criterion in block 808. The criterion used to determine where to write the data of the write memory command and the value of the staling counter to the system cache may be any known criterion such as a cache placement policy, cache replacement policy, cache coherency policy, etc. The memory control device may also write the value of the staling counter as the local counter to the system cache in association with the data of the write memory command written to the system cache. For example, the memory control device may write the value of the staling counter to a tag location in the system cache associated with the data of the write memory command written to the system cache. In some embodiments, the memory control device writing the data of the write memory command and the value of the staling counter to the memory at the locations according to the criterion in block 808 may be the processor and/or the memory controller.

Following or as part of writing the data of the write memory command and the value of the staling counter to the memory at the locations for which the replacement value exceeds or equals the staling threshold in block 806; or writing the data of the write memory command and the value of the staling counter to the memory at the locations according to the criterion in block 808, the memory control device may receive a signal for updating a staling counter for data in the system cache. For example, the memory control device may read a register (e.g., register 222 in FIGS. 2 and 3), receive a direct interrupt, etc. for updating the staling counter for data in the system cache in block 810. The register may be associated with a staling counter update feature for the criterion aware cache replacement policy and may have value configured to indicate to the memory control device whether to update the staling counter. The value of the register may be set, for example, by writing to the register for updating the staling counter for data in the system cache as described for block 604 of the method 600 with reference to FIG. 6. The memory control device may read the value of the value of the register for updating the staling counter. In some embodiments, the memory control device receiving the signal for updating the staling counter for data in the system cache in block 810 may be the processor and/or the memory controller.

In optional determination block 812, the memory control device may determine whether the register value indicates to the memory control device to update the staling counter. The value stored in the register may be configured to indicate to the memory control device whether to update the staling counter. For example, the register value may be set the staling counter update value to a "1" value configured to indicate to the memory control device to update the staling counter, and to a "0" value configured to indicate to the memory control device not to update the staling counter, or vice versa. The memory control device may interpret the register value read in block 810 to determine whether the register value indicates to update the staling counter. In some embodiments, the memory control device may read the value of the value of the register for updating the staling counter. In some embodiments, the memory control device determining whether the register value indicates to the memory control device to update the staling counter in optional determination block 812 may be the processor and/or the memory controller.

After receiving the signal for updating the staling counter for data in the system cache in block 810; or in response to determining that the register value indicates to the memory control device to update the staling counter (i.e., optional determination block 812="Yes"), the memory control device may update the staling counter in block 814. In some embodiments, updating the staling counter in block 814 may be performed when (i.e., at approximately the same time) data is written to the system cache (e.g., in blocks 806 or 808). Updating the staling counter may be implemented by any mathematical operation, algorithmic operation, heuristic operation, etc., such as by incrementing and/or decrementing the staling counter. In some embodiments, the memory control device updating the staling counter in block 814 may be the processor and/or the memory controller.

Following updating the staling counter in block 814; or in response to determining that the register value indicates to the memory control device not to update the staling counter (i.e., optional determination block 812="No"), the memory control device may receive a write memory command in block 606 of the method 600 as described with reference to FIG. 6. The memory control device receiving the write memory command in block 606 may be the processor and/or a memory controller.

Figure 9:
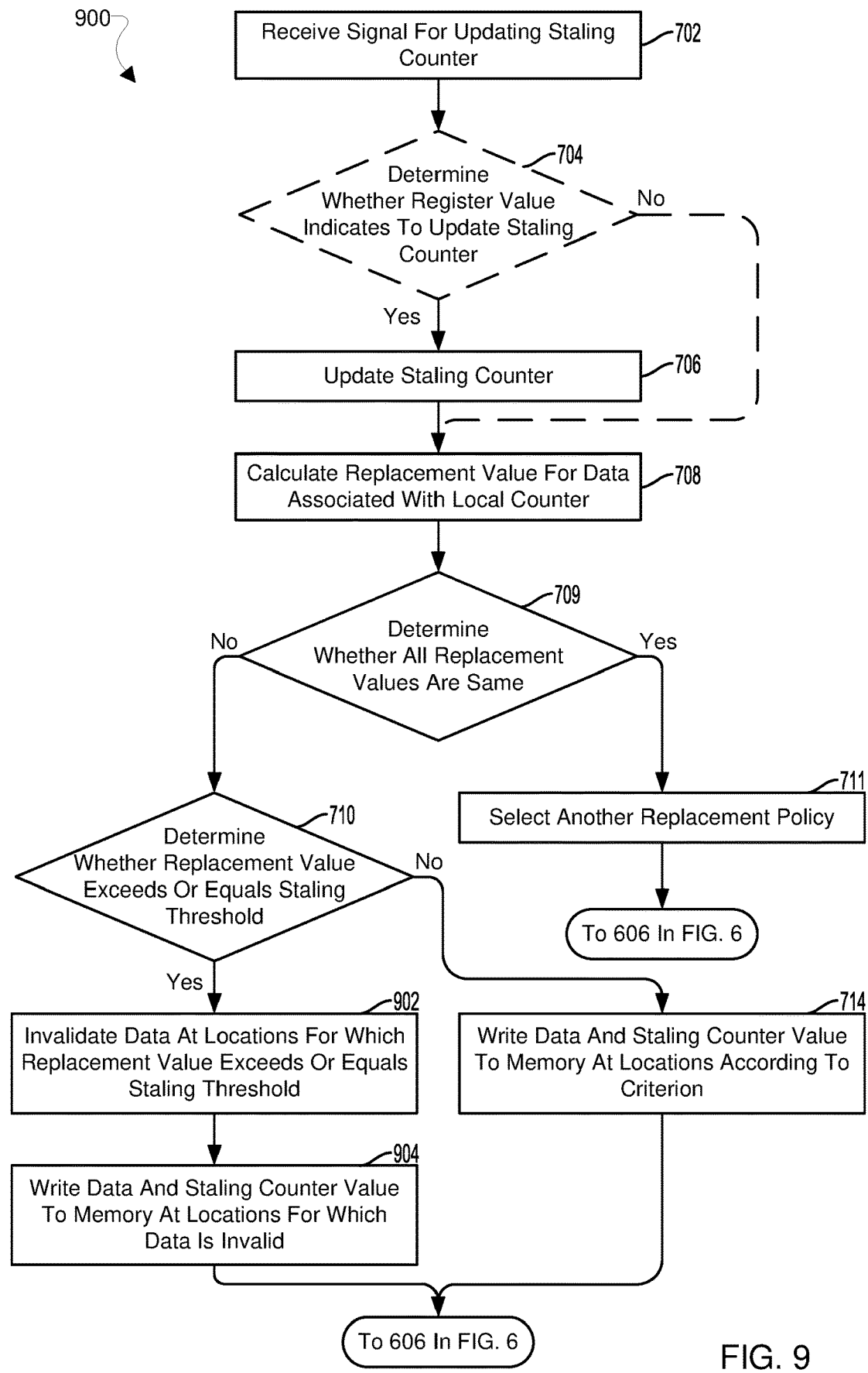
FIG. 9 is a process flow diagram illustrating a method for implementing criterion aware cache replacement policy replacing data based on invalidating data based a value of a local counter according to an embodiment.

FIG. 9 illustrates a method 900 for implementing criterion aware cache replacement policy replacing data based on invalidating data based a value of a local counter according to some embodiments. With reference to FIGS. 1-9, the method 900 may be implemented in a computing device (e.g., computing device 100 in FIG. 1), in hardware, in software (e.g., client 300 in FIG. 3) executing in a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3), or in a combination of a software-configured processor and dedicated hardware that includes other individual components, such as various memories/caches (e.g., memory 106, memory 114 in FIG. 1, L2 cache 208a, 208b, 208c, 210a, 210b, 210c, L3 cache 216 in FIG. 2, system cache 218, registers 222 in FIGS. 2 and 3, system cache 400 in FIG. 4) and various memory/cache controllers (e.g., memory controller 220 in FIGS. 2 and 3). In order to encompass the alternative configurations enabled in various embodiments, the hardware implementing the method 900 is referred to herein as a "memory control device." Blocks 702-711, 714, 902, 904 of the method 900 describe operations that may be performed as part of the operations in block 608 of the method 600 described with reference to FIG. 6. Blocks 702-711, 714 may be implemented in a similar manner as like numbered blocks of the method 700 described with reference to FIG. 7.

In response to determining that the replacement value exceeds or equals the staling threshold (i.e., determination block 710="Yes"), the memory control device may invalidate data at locations for which the replacement value exceeds or equals the staling threshold in block 902. A result of the comparison of the replacement value and the staling threshold in determination block 710 may indicate to the memory control device whether the criterion aware cache replacement policy should replace the data associated with the local counter value used to calculate the replacement value in block 708. For example, in response to the replacement value exceeding or equaling the staling threshold, the memory control device may implement the criterion aware cache replacement policy to replace the replace the data associated with the local counter value with the data of the write memory command. The memory control device may invalidate data using known manners of invalidating data in memory. For example, the memory control device may write a value of a validity/invalidity bit associated with a location of a system cache (e.g., system cache 218, in FIGS. 2 and 3, system cache 400 in FIG. 4) associated with the local counter value used to calculate the replacement value in block 708. The value of the validity/invalidity bit may be configured to indicate to the memory control device whether the data at the location of the system cache is valid/invalid. In some embodiments, the memory control device invalidating the data at the locations for which the replacement value exceeds or equals the staling threshold in block 902 may be a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) and/or a memory controller (e.g., memory controller 220 in FIGS. 2 and 3).

In block 904, the memory control device may write the data of the write memory command, received in block 606 of the method 600 (FIG. 6), and the value of the staling counter to memory at locations for which data is invalid. The memory control device may read the validity/invalidity bit of locations in the system cache to determine which locations have data that is valid/invalid. The memory control device may replace the data associated with the local counter value by writing the data of the write memory command to the locations in the system cache storing the data associated with the validity/invalidity bit. The memory control device may also write the value of the staling counter as the local counter to the system cache in association with the data of the write memory command written to the system cache. For example, the memory control device may write the value of the staling counter to a tag location in the system cache associated with the data of the write memory command written to the system cache. In some embodiments, the memory control device writing the data of the write memory command and the value of the staling counter to the memory at the locations for which data is invalid in block 904 may be the processor and/or the memory controller.

Following writing the data of the write memory command and the value of the staling counter to the memory at the locations for which data is invalid in block 904; or writing the data of the write memory command and the value of the staling counter to the memory at the locations according to the criterion in block 714, the memory control device may receive a write memory command in block 606 of the method 600 as described with reference to FIG. 6. The memory control device receiving the write memory command in block 606 may be the processor and/or a memory controller.

Figure 10:
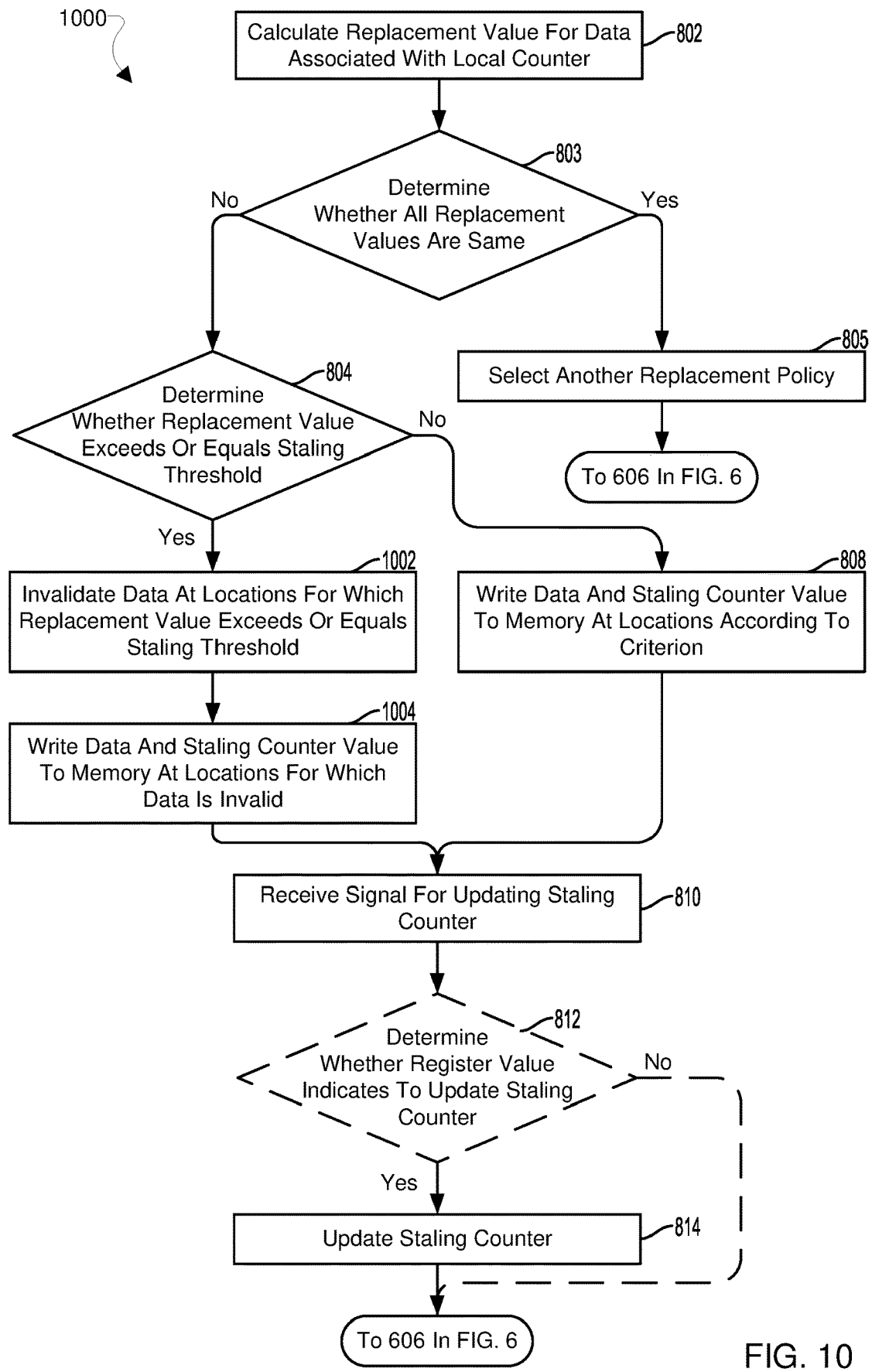
FIG. 10 is a process flow diagram illustrating a method for implementing criterion aware cache replacement policy replacing data based on invalidating data based a value of a local counter according to an embodiment.

FIG. 10 illustrates a method 1000 for implementing criterion aware cache replacement policy replacing data based on invalidating data based a value of a local counter according to some embodiments. With reference to FIGS. 1-10, the method 1000 may be implemented in a computing device (e.g., computing device 100 in FIG. 1), in hardware, in software (e.g., client 300 in FIG. 3) executing in a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3), or in a combination of a software-configured processor and dedicated hardware that includes other individual components, such as various memories/caches (e.g., memory 106, memory 114 in FIG. 1, L2 cache 208a, 208b, 208c, 210a, 210b, 210c, L3 cache 216 in FIG. 2, system cache 218, registers 222 in FIGS. 2 and 3, system cache 400 in FIG. 4) and various memory/cache controllers (e.g., memory controller 220 in FIGS. 2 and 3). In order to encompass the alternative configurations enabled in various embodiments, the hardware implementing the method 1000 is referred to herein as a "memory control device." Blocks 802-805 808-814, 1002, 1004 of the method 1000 may describe operations that may be performed as part of the block 608 of the method 600 described with reference to FIG. 6. Blocks 802-805 808-814 may be implemented in a similar manner as like numbered blocks of the method 800 described herein with reference to FIG. 8.

In response to determining that the replacement value exceeds or equals the staling threshold (i.e., determination block 804="Yes"), the memory control device may invalidate data at locations for which the replacement value exceeds or equals the staling threshold in block 1002. A result of the comparison of the replacement value and the staling threshold in determination block 804 may indicate to the memory control device whether the criterion aware cache replacement policy should replace the data associated with the local counter value used to calculate the replacement value in block 802. For example, in response to the replacement value exceeding or equaling the staling threshold, the memory control device may implement the criterion aware cache replacement policy to replace the replace the data associated with the local counter value with the data of the write memory command. The memory control device may invalidate data using known manners of invalidating data in memory. For example, the memory control device may write a value of a validity/invalidity bit associated with a location of a system cache (e.g., system cache 218, in FIGS. 2 and 3, system cache 400 in FIG. 4) associated with the local counter value used to calculate the replacement value in block 802. The value of the validity/invalidity bit may be configured to indicate to the memory control device whether the data at the location of the system cache is valid/invalid. In some embodiments, the memory control device invalidating the data at the locations for which the replacement value exceeds or equals the staling threshold in block 1002 may be a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) and/or a memory controller (e.g., memory controller 220 in FIGS. 2 and 3).

In block 1004, the memory control device may write the data of the write memory command, received in block 606 of the method 600 (FIG. 6), and the value of the staling counter to memory at locations for which data is invalid. The memory control device may read the validity/invalidity bit of locations in the system cache to determine which locations have data that is valid/invalid. The memory control device may replace the data associated with the local counter value by writing the data of the write memory command to the locations in the system cache storing the data associated with the validity/invalidity bit. The memory control device may also write the value of the staling counter as the local counter to the system cache in association with the data of the write memory command written to the system cache. In some embodiments, updating the staling counter by writing the value of the staling counter as the local counter to the system cache in association with the data of the write memory command in block 1004 may be performed when (i.e., at approximately the same time) the data is written to the system cache. For example, the memory control device may write the value of the staling counter to a tag location in the system cache associated with the data of the write memory command written to the system cache. In some embodiments, the memory control device writing the data of the write memory command and the value of the staling counter to the memory at the locations for which data is invalid in block 1004 may be the processor and/or the memory controller.

Figure 11:
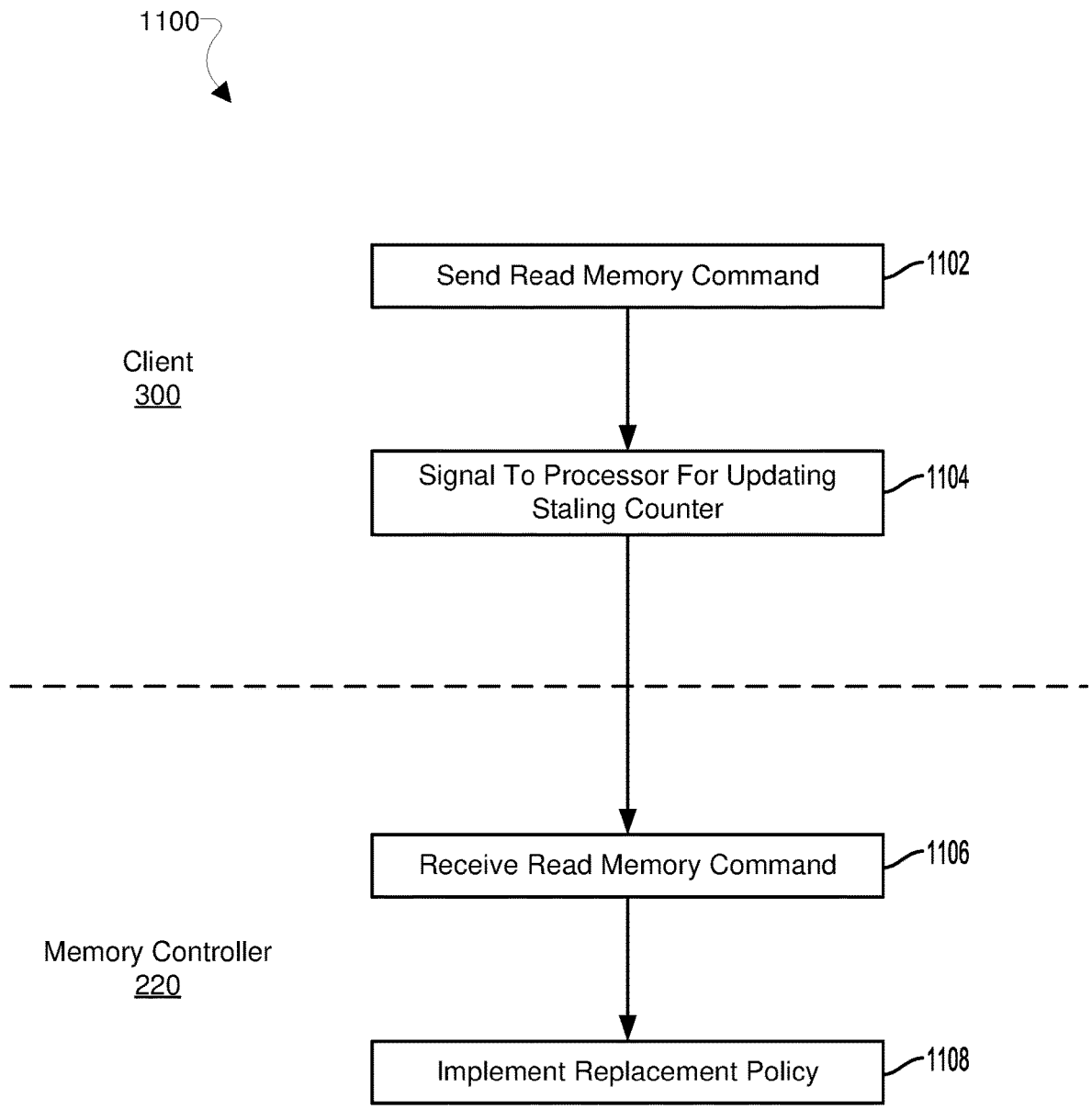
FIG. 11 is a process flow diagram illustrating a method for implementing criterion aware cache replacement policy of a local counter according to an embodiment.

FIG. 11 illustrates a method 1100 for implementing a criterion aware cache replacement policy according to some embodiments. With reference to FIGS. 1-11, the method 1100 may be implemented in a computing device (e.g., computing device 100 in FIG. 1), in hardware, in software (e.g., client 300 in FIG. 3) executing in a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3), or in a combination of a software-configured processor and dedicated hardware that includes other individual components, such as various memories/caches (e.g., memory 106, memory 114 in FIG. 1, L2 cache 208a, 208b, 208c, 210a, 210b, 210c, L3 cache 216 in FIG. 2, system cache 218, registers 222 in FIGS. 2 and 3, system cache 400 in FIG. 4) and various memory/cache controllers (e.g., memory controller 220 in FIGS. 2 and 3). In order to encompass the alternative configurations enabled in various embodiments, the hardware implementing the method 1100 is referred to herein as a "client" and a "memory control device."

In block 1102, a client may send a read memory command targeted at a system cache (e.g., system cache 218, in FIGS. 2 and 3, system cache 400 in FIG. 4).

In block 1104, the client may send a signal to a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) indicating that the processor should update a staling counter for data in the system cache. The client may signal the processor using various types of signal communications, including, for example, a register write to a register (e.g., register 222 in FIGS. 2 and 3), a direct interrupt to the processor, etc. The register may be associated with a staling counter update feature for a criterion aware cache replacement policy. Writing to the register may set a value of the register configured to indicate to a memory control device whether to the memory control device should update the staling counter. In some embodiments, the client sending the read memory command in block 1102 and signaling to the processor for updating the staling counter for data in the system cache in block 1104 may be a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) and/or a software program (e.g., client 300 in FIG. 3), such as an operating system and/or an application.

In block 1106, a memory control device may receive the read memory command. The memory control device may be configured to manage, control, and/or implement memory access, cache maintenance, cache coherency, and/or cache replacement policies for the system cache.

In block 1108, the memory control device may implement a criterion aware cache replacement policy for writing data of the read memory command in the system cache. The memory control device receiving the read memory command in block 1106 and implementing the criterion aware cache replacement policy in block 1108 may be a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3) and/or a memory controller (e.g., memory controller 220 in FIGS. 2 and 3).

Figure 12:
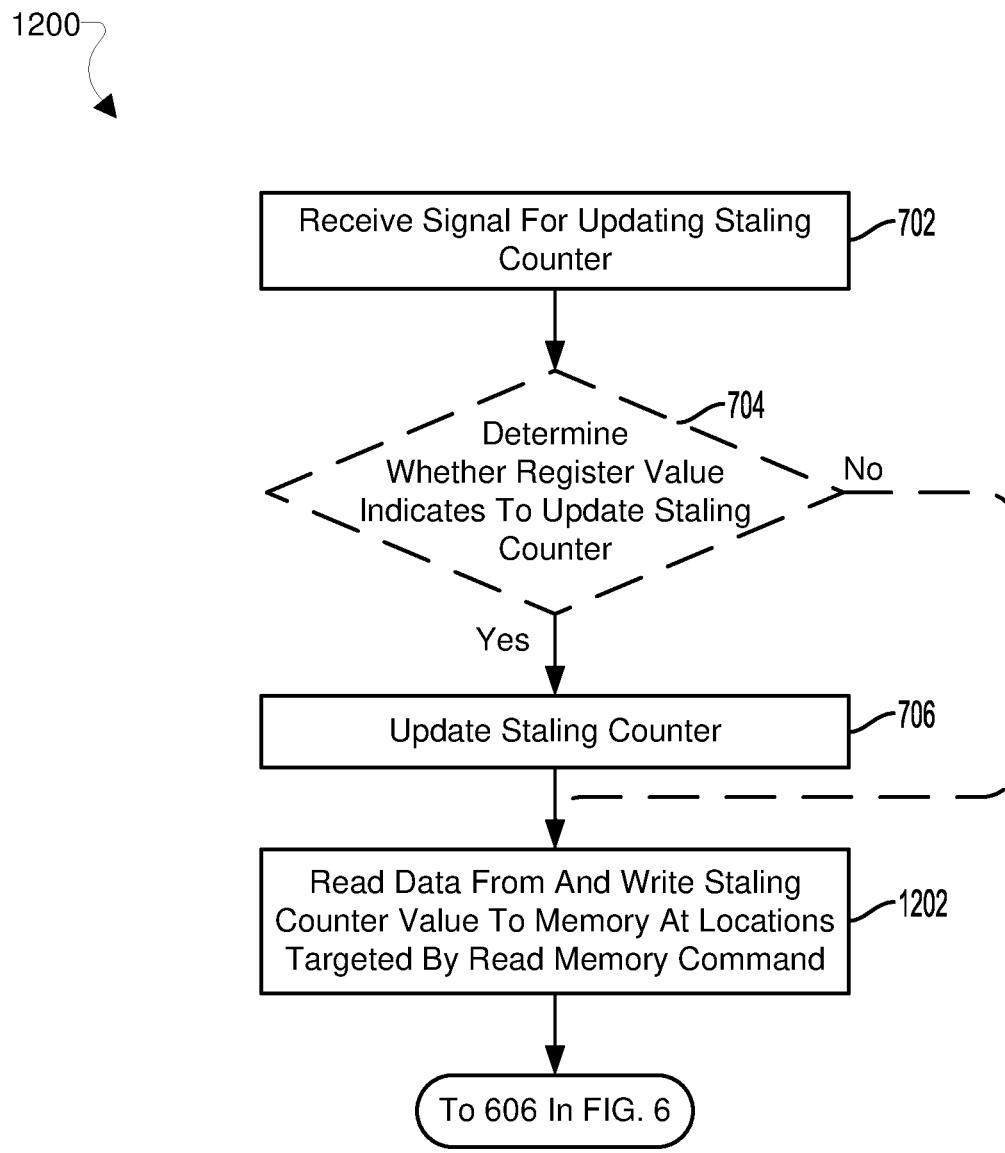
FIG. 12 is a process flow diagram illustrating a method for implementing criterion aware cache replacement policy replacing data based on a value of a local counter according to an embodiment.

FIG. 12 illustrates a method 1200 for implementing criterion aware cache replacement policy replacing data based on invalidating data based on a value of a local counter according to some embodiments. With reference to FIGS. 1-12, the method 1200 may be implemented in a computing device (e.g., computing device 100 in FIG. 1), in hardware, in software (e.g., client 300 in FIG. 3) executing in a processor (e.g., CPU 104, processor 124 in FIG. 1, processor 202, processor core 204a, 204b, 204c, 206a, 206b, 206c, processor core cluster 212, 214 in FIG. 2, client 300 in FIG. 3), or in a combination of a software-configured processor and dedicated hardware that includes other individual components, such as various memories/caches (e.g., memory 106, memory 114 in FIG. 1, L2 cache 208a, 208b, 208c, 210a, 210b, 210c, L3 cache 216 in FIG. 2, system cache 218, registers 222 in FIGS. 2 and 3, system cache 400 in FIG. 4) and various memory/cache controllers (e.g., memory controller 220 in FIGS. 2 and 3). In order to encompass the alternative configurations enabled in various embodiments, the hardware implementing the method 1200 is referred to herein as a "memory control device." Blocks 702-706, 1202 of the method 1200 describe operations that may be performed as part of the operations in block 1108 of the method 1100 described with reference to FIG. 11. Blocks 702-706 may be implemented in a similar manner as like numbered blocks of the method 700 as described with reference to FIG. 7.

In response to determining that the register value indicates that the memory control device should not update the staling counter (i.e., optional determination block 704="No"); or following updating the staling counter in block 706, the memory control device may read data from and write the value of the staling counter to memory at locations targeted by the read memory command, received in block 1106 of the method 1100 (FIG. 11). The memory control device may read the data at the locations in a system cache (e.g., system cache 218, in FIGS. 2 and 3, system cache 400 in FIG. 4) targeted by the read memory command. The memory control device may also write the value of the staling counter as the local counter to the system cache in association with the data targeted by the read memory command in the system cache. For example, the memory control device may write the value of the staling counter to a tag location in the system cache associated with the data targeted by the read memory command in the system cache. In some embodiments, the memory control device reading the data from and writing the value of the staling counter to the memory at the locations targeted by the read memory command in block 1202 may be a processor (e.g., CPU 104, processor 124 in FIG. 1, processor 202, processor core 204*a*, 204*b*, 204*c*, 206*a*, 206*b*, 206*c*, processor core cluster 212, 214 in FIG. 2, client 300 in FIG. 3) and/or a memory controller (e.g., memory controller 220 in FIGS. 2 and 3).

Following reading the data from and writing the value of the staling counter to the memory at the locations targeted by the read memory command in block 1202, the memory control device may receive a write memory command in block 606 of the method 600 as described with reference to FIG. 6. The memory control device receiving the write memory command in block 606 may be the processor and/or a memory controller.

Figure 13:
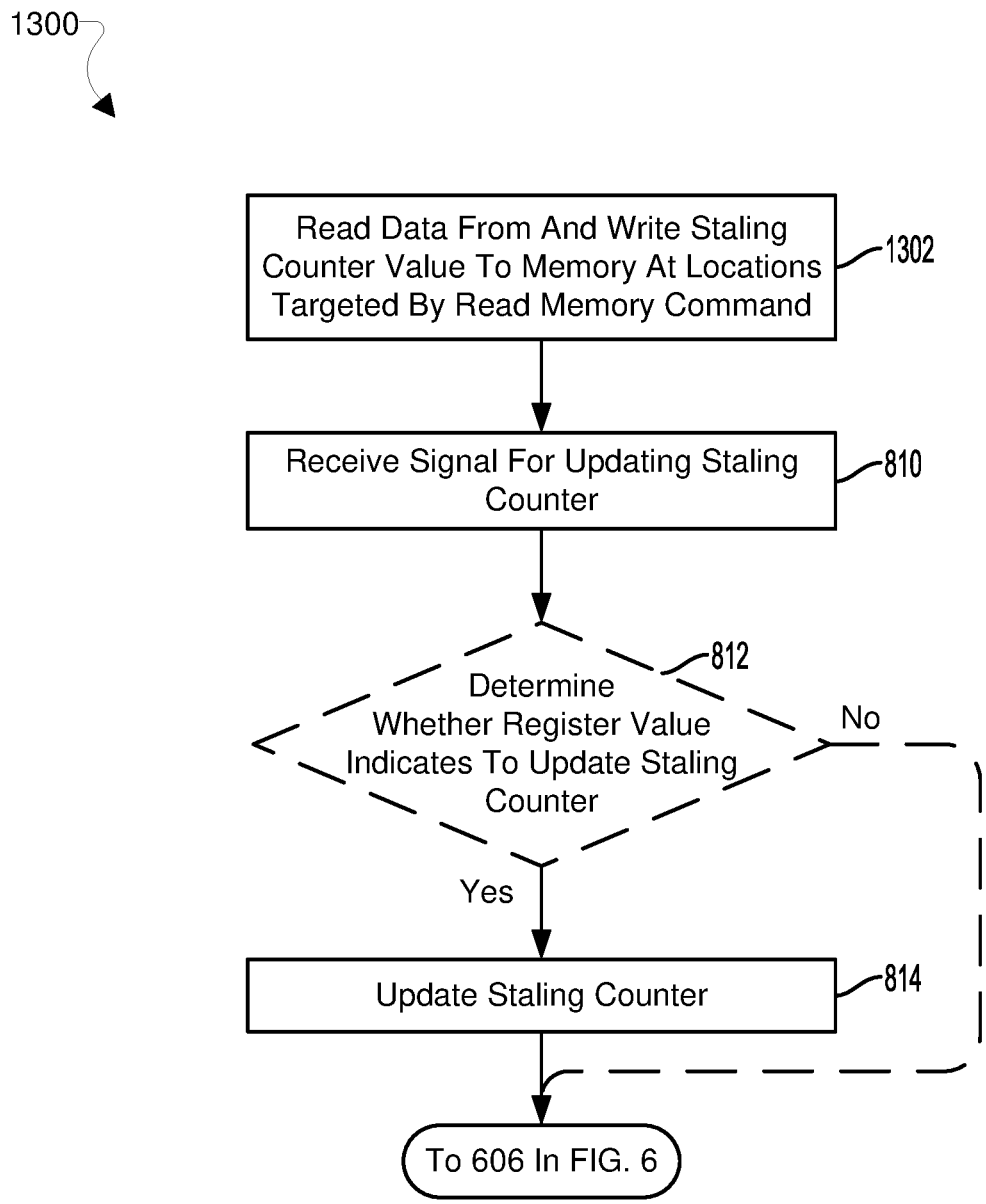
FIG. 13 is a process flow diagram illustrating a method for implementing criterion aware cache replacement policy replacing data based on a value of a local counter according to an embodiment.

FIG. 13 illustrates a method 1300 for implementing criterion aware cache replacement policy replacing data based on invalidating data based on a value of a local counter according to some embodiments. With reference to FIGS. 1-13, the method 1300 may be implemented in a computing device (e.g., computing device 100 in FIG. 1), in hardware, in software (e.g., client 300 in FIG. 3) executing in a processor (e.g., CPU 104, processor 124 in FIG. 1, processor 202, processor core 204*a*, 204*b*, 204*c*, 206*a*, 206*b*, 206*c*, processor core cluster 212, 214 in FIG. 2, client 300 in FIG. 3), or in a combination of a software-configured processor and dedicated hardware that includes other individual components, such as various memories/caches (e.g., memory 106, memory 114 in FIG. 1, L2 cache 208*a*, 208*b*, 208*c*, 210*a*, 210*b*, 210*c*, L3 cache 216 in FIG. 2, system cache 218, registers 222 in FIGS. 2 and 3, system cache 400 in FIG. 4) and various memory/cache controllers (e.g., memory controller 220 in FIGS. 2 and 3). In order to encompass the alternative configurations enabled in various embodiments, the hardware implementing the method 1300 is referred to herein as a "memory control device." Blocks 810-814, 1202 of the method 1200 describe operations that may be performed as part of the operations in block 1108 of the method 1100 as described with reference to FIG. 11. Blocks 810-814 may be implemented in a similar manner as like numbered blocks of the method 800 as described with reference to FIG. 8.

In block 1302, the memory control device may read data from and write a staling counter value to memory at locations targeted by the read memory command, received in block 1106 of the method 1100 (FIG. 11). The memory control device may read the data at the locations in a system cache (e.g., system cache 218, in FIGS. 2 and 3, system cache 400 in FIG. 4) targeted by the read memory command. The memory control device may also write the value of the staling counter as a local counter to a system cache in association with the data targeted by the read memory command in the system cache. For example, the memory control device may write the value of the staling counter to a tag location in the system cache associated with the data targeted by the read memory command in the system cache. In some embodiments, the memory control device reading the data from and writing the value of the staling counter to the memory at the locations targeted by the read memory command in block 1302 may be a processor (e.g., CPU 104, processor 124 in FIG. 1, processor 202, processor core 204*a*, 204*b*, 204*c*, 206*a*, 206*b*, 206*c*, processor core cluster 212, 214 in FIG. 2, client 300 in FIG. 3) and/or a memory controller (e.g., memory controller 220 in FIGS. 2 and 3).

Figure 14:
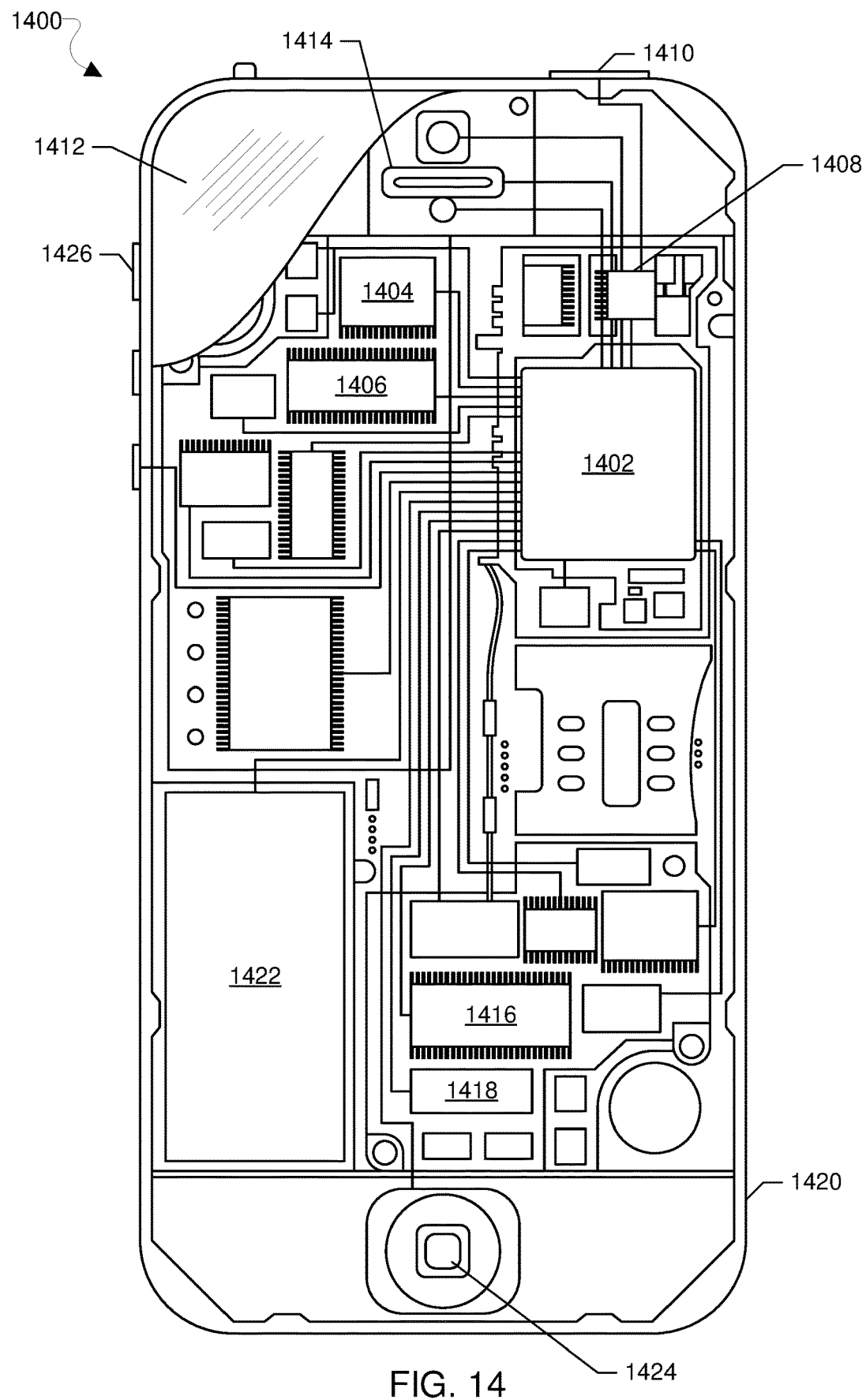
FIG. 14 is a component block diagram illustrating an example mobile computing device suitable for implementing various embodiments.

A system in accordance with the various embodiments (including, but not limited to, embodiments described above with reference to FIGS. 1-13) may be implemented in a wide variety of computing systems including mobile computing devices, an example of which suitable for use with the various embodiments is illustrated in FIG. 14. The mobile computing device 1400 may include a processor 1402 coupled to a touchscreen controller 1404 and an internal memory 1406. The processor 1402 may be one or more multicore integrated circuits designated for general or specific processing tasks. The internal memory 1406 may be volatile or non-volatile memory, and may also be secure and/or encrypted memory, or unsecure and/or unencrypted memory, or any combination thereof. Examples of memory types that can be leveraged include but are not limited to DDR, Low-Power DDR (LPDDR), Graphics DDR (GDDR), WIDEIO, RAM, Static RAM (SRAM), Dynamic RAM (DRAM), Parameter RAM (P-RAM), Resistive RAM (R-RAM), Magnetoresistive RAM (M-RAM), Spin-Transfer Torque RAM (STT-RAM), and embedded DRAM. The touchscreen controller 1404 and the processor 1402 may also be coupled to a touchscreen panel 1412, such as a resistive-sensing touchscreen, capacitive-sensing touchscreen, infrared sensing touchscreen, etc. Additionally, the display of the mobile computing device 1400 need not have touch screen capability.

The mobile computing device 1400 may have one or more radio signal transceivers 1408 (e.g., Peanut, Bluetooth, ZigBee, Wi-Fi, RF radio) and antennae 1410, for sending and receiving communications, coupled to each other and/or to the processor 1402. The transceivers 1408 and antennae 1410 may be used with the above-mentioned circuitry to implement the various wireless transmission protocol stacks and interfaces. The mobile computing device 1400 may include a cellular network wireless modem chip 1416 that enables communication via a cellular network and is coupled to the processor.

The mobile computing device 1400 may include a peripheral device connection interface 1418 coupled to the processor 1402. The peripheral device connection interface 1418 may be singularly configured to accept one type of connection, or may be configured to accept various types of physical and communication connections, common or proprietary, such as Universal Serial Bus (USB), FireWire, Thunderbolt, or PCIe. The peripheral device connection interface 1418 may also be coupled to a similarly configured peripheral device connection port (not shown).

The mobile computing device 1400 may also include speakers 1414 for providing audio outputs. The mobile computing device 1400 may also include a housing 1420, constructed of a plastic, metal, or a combination of materials, for containing all or some of the components described herein. The mobile computing device 1400 may include a power source 1422 coupled to the processor 1402, such as a disposable or rechargeable battery. The rechargeable battery may also be coupled to the peripheral device connection port to receive a charging current from a source external to the mobile computing device 1400. The mobile computing device 1400 may also include a physical button 1424 for receiving user inputs. The mobile computing device 1400 may also include a power button 1426 for turning the mobile computing device 1400 on and off.

Figure 15:
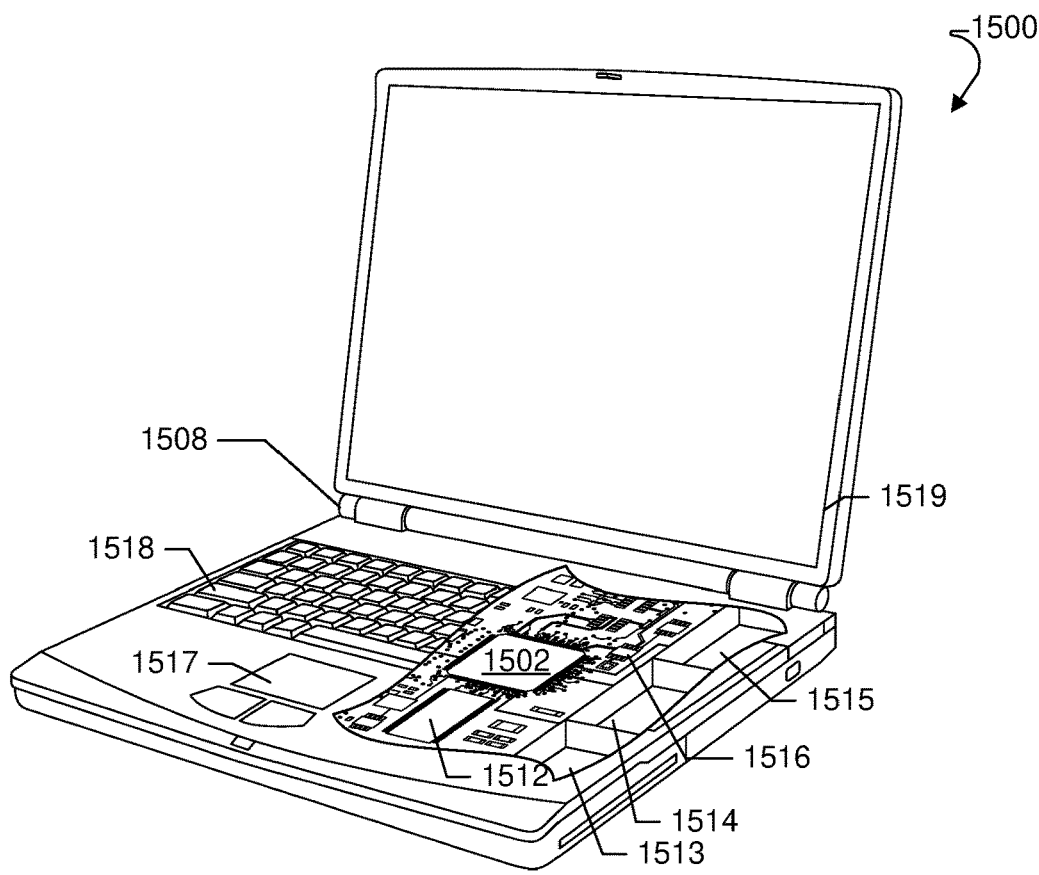
FIG. 15 is a component block diagram illustrating an example mobile computing device suitable for implementing various embodiments.

A system in accordance with the various embodiments (including, but not limited to, embodiments described above with reference to FIGS. 1-12) may be implemented in a wide variety of computing systems include a laptop computer 1500 an example of which is illustrated in FIG. 15. Many laptop computers include a touchpad touch surface 1517 that serves as the computer's pointing device, and thus may receive drag, scroll, and flick gestures similar to those implemented on computing devices equipped with a touch screen display and described above. A laptop computer 1500 will typically include a processor 1502 coupled to volatile memory 1512 and a large capacity nonvolatile memory, such as a disk drive 1513 of Flash memory. Additionally, the computer 1500 may have one or more antenna 1508 for sending and receiving electromagnetic radiation that may be connected to a wireless data link and/or cellular telephone transceiver 1516 coupled to the processor 1502. The computer 1500 may also include a floppy disc drive 1514 and a compact disc (CD) drive 1515 coupled to the processor 1502. In a notebook configuration, the computer housing includes the touchpad 1517, the keyboard 1518, and the display 1519 all coupled to the processor 1502. Other configurations of the computing device may include a computer mouse or trackball coupled to the processor (e.g., via a USB input) as are well known, which may also be used in conjunction with the various embodiments.

Figure 16:
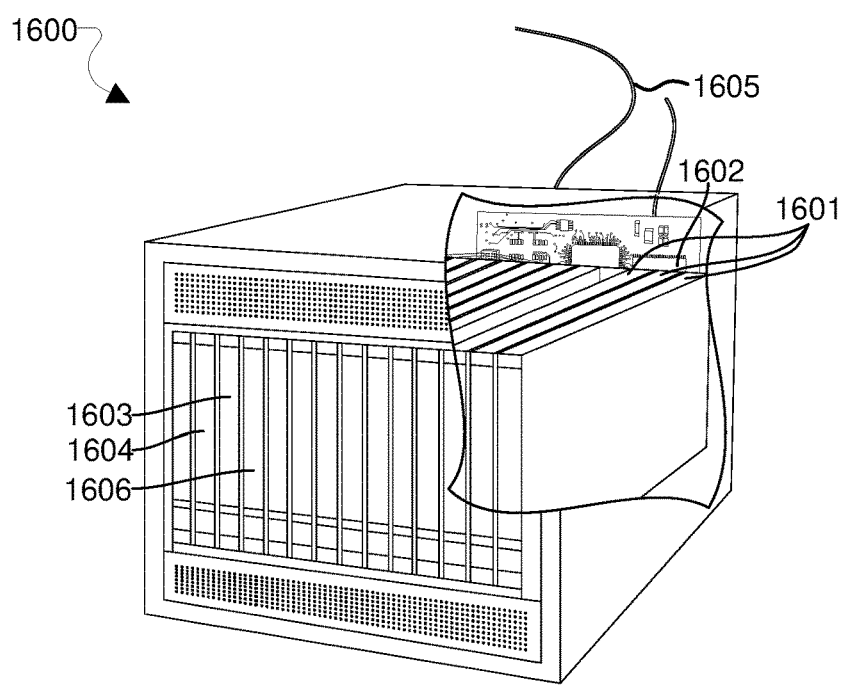
FIG. 16 is a component block diagram illustrating an example server suitable for implementing various embodiments.

A system in accordance with the various embodiments (including, but not limited to, embodiments described above with reference to FIGS. 1-12) may also be implemented in fixed computing systems, such as any of a variety of commercially available servers. An example server 1600 is illustrated in FIG. 16. Such a server 1600 typically includes one or more multicore processor assemblies 1601 coupled to volatile memory 1602 and a large capacity nonvolatile memory, such as a disk drive 1604. As illustrated in FIG. 16, multicore processor assemblies 1601 may be added to the server 1600 by inserting them into the racks of the assembly. The server 1600 may also include a floppy disc drive, compact disc (CD) or digital versatile disc (DVD) disc drive 1606 coupled to the processor 1601. The server 1600 may also include network access ports 1603 coupled to the multicore processor assemblies 1601 for establishing network interface connections with a network 1605, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Implementation examples are described in the following paragraphs. While some of the following implementation examples are described in terms of example systems, devices, or methods, further example implementations may include: the example systems or devices discussed in the following paragraphs implemented as a method executing operations of the example systems or devices, the example systems, devices, or methods discussed in the following paragraphs implemented by a computing device comprising a processing device configured with processing device-executable instructions to perform operations of the example systems, devices, or methods; a computing device comprising a memory control device configured to perform operations of the example systems, devices, or methods; the example systems, devices, or methods discussed in the following paragraphs implemented by a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. A method for implementing a criterion aware cache replacement policy by a computing device, including updating a staling counter, writing a value of a local counter to a system cache in association with a location in the system cache for associated data, in which the value of the local counter includes a value of the staling counter when the associated data is written to the system cache, and using the value of the local counter of the associated data to determine whether the associated data is stale.

Example 2. The method of example 1, in which updating the staling counter includes receiving a signal from a client of the computing device configured to indicate whether to update the staling counter, determining whether to update the staling counter based on the signal, and updating the staling counter in response to determining to update the staling counter.

Example 3. The method of any of examples 1 or 2, in which the signal is a register write command, and in which receiving the signal from the client of the computing device includes reading a value from a register set by the client, and determining whether to update the staling counter based on the signal includes determining whether to update the staling counter based on the value from the register.

Example 4. The method of example 3, further including setting the value at the register by the client of the computing device based on a time-based criterion.

Example 5. The method of example 3, further including setting the value at the register by the client of the computing device based on an event based criterion.

Example 6. The method of any of examples 1-5, further including receiving a memory write command, in which writing the value of the local counter to the system cache in association with the location in the system cache for the associated data may occur before updating the staling counter, in which the associated data is data of the write memory command.

Example 7. The method of any of examples 1-6, in which using the value of the local counter of the associated data to determine whether the associated data is stale includes calculating a replacement value using a value of the staling counter and the value of the local counter, and determining whether the replacement value exceeds a staling threshold, in which the associated data is determined to be stale in response to determining that the replacement value exceeds the staling threshold.

Example 8. The method of example 7, further including receiving a memory access command, and writing data of the memory access command to the system cache at a location for which the replacement value exceeds the staling threshold, in which the data of the memory access command written to the system cache is the associated data.

Example 9. The method of example 7, further including receiving a memory write command, invalidating data at a location for which the replacement value exceeds the staling threshold, and writing data of the memory write command to the system cache at a location having the invalidated data, in which the data of the memory write command written to the system cache is the associated data.

Example 10. The method of any of examples 1-9, further including receiving a memory write access command, and writing data of the memory write access command to the system cache at a location according to another cache replacement policy in response to determining that no replacement value exceeds the staling threshold.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for implementing a criterion aware cache replacement policy by a computing device, comprising:
    updating a staling counter;
    writing a value of a local counter to a system cache in association with a location in the system cache for associated data, wherein the value of the local counter includes a value of the staling counter when the associated data is written to the system cache;
    calculating a replacement value using a value of the staling counter and the value of the local counter of the associated data;
    determining whether all replacement values for a plurality of associated data in a portion of the system cache are equal to one another; and
    determining whether the replacement value exceeds a staling threshold in response to determining that not all of the replacement values for the plurality of associated data in the portion of the system cache are equal to one another, wherein the associated data is determined to be stale in response to determining that the replacement value exceeds the staling threshold.

2. The method of claim 1, wherein updating the staling counter comprises:
    receiving a signal from a client of the computing device configured to indicate whether to update the staling counter;
    determining whether to update the staling counter based on the signal; and
    updating the staling counter in response to determining to update the staling counter.

3. The method of claim 2, wherein the signal is a register write command, and wherein:

receiving the signal from the client of the computing device comprises reading a value from a register set by the client; and
determining whether to update the staling counter based on the signal comprises determining whether to update the staling counter based on the value from the register.

4. The method of claim 3, further comprising setting the value at the register by the client of the computing device based on a time-based criterion.

5. The method of claim 3, further comprising setting the value at the register by the client of the computing device based on an event based criterion.

6. The method of claim 1, further comprising receiving a memory write command, wherein writing the value of the local counter to the system cache in association with the location in the system cache for the associated data occurs before updating the staling counter, wherein the associated data is data of the write memory command.

7. The method of claim 1, further comprising:
receiving a memory access command; and
writing data of the memory access command to the system cache at a location for which the replacement value exceeds the staling threshold, wherein the data of the memory access command written to the system cache is the associated data.

8. The method of claim 1, further comprising:
receiving a memory write command;
invalidating data at a location for which the replacement value exceeds the staling threshold; and
writing data of the memory write command to the system cache at a location having the invalidated data, wherein the data of the memory write command written to the system cache is the associated data.

9. The method of claim 1, further comprising:
receiving a memory write access command; and
writing data of the memory write access command to the system cache at a location according to another cache replacement policy in response to determining that no replacement value exceeds the staling threshold.

10. The method of claim 1, wherein calculating the replacement value using the value of the staling counter and the value of the local counter of the associated data comprises calculating a difference between the value of the staling counter and the value of the local counter.

11. A computing device, comprising:
a memory control device configured to:
update a staling counter;
write a value of a local counter to a system cache in association with a location in the system cache for associated data, wherein the value of the local counter includes a value of the staling counter when the associated data is written to the system cache;
calculate a replacement value using a value of the staling counter and the value of the local counter of the associated data;
determine whether all replacement values for a plurality of associated data in a portion of the system cache are equal to one another; and
determine whether the replacement value exceeds a staling threshold in response to determining that not all of the replacement values for the plurality of associated data in the portion of the system cache are equal to one another, wherein the associated data is determined to be stale in response to determining that the replacement value exceeds the staling threshold.

12. The computing device of claim 11, wherein the memory control device is further configured to update the staling counter by:
receiving a signal from a client of the computing device configured to indicate whether to update the staling counter;
determining whether to update the staling counter based on the signal; and
updating the staling counter in response to determining to update the staling counter.

13. The computing device of claim 12, wherein:
the signal is a register write command; and
the memory control device is further configured to:
receive the signal from the client of the computing device by reading a value from a register set by the client; and
determine whether to update the staling counter based on the signal by determining whether to update the staling counter based on the value from the register.

14. The computing device of claim 13, further comprising a client configured to set the value at the register based on a time-based criterion.

15. The computing device of claim 13, further comprising a client configured to set the value at the register based on an event based criterion.

16. The computing device of claim 11, wherein the memory control device is further configured to:
receive a memory write command; and
write the value of the local counter to the system cache in association with the location in the system cache for the associated data before updating the staling counter, wherein the associated data is data of the write memory command.

17. The computing device of claim 11, wherein the memory control device is further configured to:
receive a memory access command; and
write data of the memory access command to the system cache at a location for which the replacement value exceeds the staling threshold, wherein the data of the memory access command written to the system cache is the associated data.

18. The computing device of claim 11, wherein the memory control device is further configured to:
receive a memory write command;
invalidate data at a location for which the replacement value exceeds the staling threshold; and
write data of the memory write command to the system cache at a location having the invalidated data, wherein the data of the memory write command written to the system cache is the associated data.

19. The computing device of claim 11, wherein the memory control device is further configured to:
receive a memory write access command; and
write data of the memory write access command to the system cache at a location according to a cache replacement policy that is different from a criterion aware cache replacement policy in response to determining that no replacement value exceeds the staling threshold.

20. The computing device of claim 11, wherein the memory control device is further configured to calculate the replacement value as a difference between the value of the staling counter and the value of the local counter.

21. A computing device, comprising:
means for updating a staling counter;
means for writing a value of a local counter to a system cache in association with a location in the system cache for associated data, wherein the value of the local counter includes a value of the staling counter when the associated data is written to the system cache;

means for calculating a replacement value using a value of the staling counter and the value of the local counter of the associated data;

means for determining whether all replacement values for a plurality of associated data in a portion of the system cache are equal to one another; and means for determining whether the replacement value exceeds a staling threshold in response to determining that not all of the replacement values for the plurality of associated data in the portion of the system cache are equal to one another, wherein the associated data is determined to be stale in response to determining that the replacement value exceeds the staling threshold.

22. The computing device of claim 21, wherein means for updating the staling counter comprises:

means for receiving a signal from a client of the computing device configured to indicate whether to update the staling counter;

means for determining whether to update the staling counter based on the signal; and means for updating the staling counter in response to determining to update the staling counter.

23. The computing device of claim 22, wherein the signal is a register write command, and wherein:

means for receiving the signal from the client of the computing device comprises means for reading a value from a register set by the client; and means for determining whether to update the staling counter based on the signal comprises means for determining whether to update the staling counter based on the value from the register.

24. The computing device of claim 23, further comprising means for setting the value at the register by the client of the computing device based on a time-based criterion or setting the value at the register by the client of the computing device based on an event based criterion.

25. The computing device of claim 21, further comprising means for receiving a memory write command, wherein means for writing the value of the local counter to the system cache in association with the location in the system cache for the associated data is implemented before updating the staling counter, wherein the associated data is data of the write memory command.

26. The computing device of claim 21, further comprising:

means for receiving a memory access command; and means for writing data of the memory access command to the system cache at a location for which the replacement value exceeds the staling threshold, wherein the data of the memory access command written to the system cache is the associated data.

27. The computing device of claim 21, further comprising:

means for receiving a memory write command;

means for invalidating data at a location for which the replacement value exceeds the staling threshold; and means for writing data of the memory write command to the system cache at a location having invalidated data, wherein the data of the memory write command written to the system cache is the associated data.

28. The computing device of claim 21, further comprising:

means for receiving a memory write access command; and means for writing data of the memory write access command to the system cache at a location according to a cache replacement policy that is different from a criterion aware cache replacement policy in response to determining that no replacement value exceeds the staling threshold.

29. The computing device of claim 21, wherein means for calculating the replacement value using the value of the staling counter and the value of the local counter of the associated data comprises means for calculating a difference between the value of the staling counter and the value of the local counter.

30. A non-transitory processor-readable medium having stored thereon processor-executable instructions configured to cause a processing device to perform operations comprising:

updating a staling counter;

writing a value of a local counter to a system cache in association with a location in the system cache for associated data, wherein the value of the local counter includes a value of the staling counter when the associated data is written to the system cache;

calculating a replacement value using a value of the staling counter and the value of the local counter of the associated data;

determining whether all replacement values for a plurality of associated data in a portion of the system cache are equal to one another; and determining whether the replacement value exceeds a staling threshold in response to determining that not all of the replacement values for the plurality of associated data in the portion of the system cache are equal to one another, wherein the associated data is determined to be stale in response to determining that the replacement value exceeds the staling threshold.

* * * * *